United States Patent
Eadala et al.

(10) Patent No.: US 11,870,683 B2
(45) Date of Patent: Jan. 9, 2024

(54) 3GPP NETWORK FUNCTION SET ADAPTATION FOR PRE-5G NETWORK ELEMENTS

(71) Applicant: Microsoft Technology Licensing, LLC, Redmond, WA (US)

(72) Inventors: Dhananjaya Reddy Eadala, Action, MA (US); Mark Gordon Libby, Groton, MA (US); Srinivas Kappla, Nashua, NH (US); Ronald Mark Parker, Manchester, MA (US); Neeraj Surana, Bengaluru (IN); Anupama Raghavan, Acton, MA (US); Bashir Ashrafi, Nashua, NH (US)

(73) Assignee: Microsoft Technology Licensing, LLC, Redmond, UT (US)

( * ) Notice: Subject to any disclaimer, the term of this patent is extended or adjusted under 35 U.S.C. 154(b) by 0 days.

(21) Appl. No.: 17/672,519

(22) Filed: Feb. 15, 2022

(65) Prior Publication Data

US 2022/0393969 A1    Dec. 8, 2022

(30) Foreign Application Priority Data

Jun. 3, 2021    (IN) .............................. 202141024811

(51) Int. Cl.
*H04L 45/24*     (2022.01)
*H04L 45/00*     (2022.01)

(52) U.S. Cl.
CPC .............. *H04L 45/24* (2013.01); *H04L 45/14* (2013.01)

(58) Field of Classification Search
CPC ................................ H04L 45/14; H04L 45/24
See application file for complete search history.

(56) References Cited

U.S. PATENT DOCUMENTS

| 2017/0230877 A1 | 8/2017 | Claassen et al. |
| 2019/0123966 A1 | 4/2019 | Boutros et al. |

(Continued)

FOREIGN PATENT DOCUMENTS

| WO | 2010097445 A1 | 9/2010 |
| WO | 2020104863 A1 | 5/2020 |

OTHER PUBLICATIONS

"Discussion on Converged Interfaces for 2/3/4/5G Access", In 3GPP Draft, S2-1909864 Discussion on Converged Interfaces for 2345G Access, 3rd Generation Partnership Project, Oct. 4, 2019, 3 Pages.

(Continued)

*Primary Examiner* — Mansour Oveissi
(74) *Attorney, Agent, or Firm* — Ray Quinney & Nebeker; James S. Bullough

(57) ABSTRACT

A method for improving availability of a type of network element in a mobile network includes receiving a first message from a source network element at a first network element instance that belongs to a network element anycast set. The first message is addressed to an anycast address that is assigned to the network element anycast set. The first network element instance processes the first message and accesses an anycast set data store in relation to processing the first message. The method also includes receiving a second message from the source network element at a second network element instance that also belongs to the network element anycast set. The second message is also addressed to the anycast address and can be received when the first network element instance is unavailable. The second network element instance processes the second message and accesses the anycast set data store in relation thereto.

20 Claims, 13 Drawing Sheets

(56) References Cited

U.S. PATENT DOCUMENTS

2020/0204618 A1\* 6/2020 Agarwal ............ H04L 63/1458
2020/0220786 A1  7/2020 Zayats et al.

OTHER PUBLICATIONS

"International Search Report and Written Opinion Issued in PCT Application No. PCT/US22/028404", dated Aug. 17, 2022, 15 Pages.

\* cited by examiner

3GPP NETWORK FUNCTION SET ADAPTATION FOR PRE-5G NETWORK ELEMENTS

CROSS-REFERENCE TO RELATED APPLICATIONS

This application claims benefit and priority to Indian Application Number 202141024811, filed on Jun. 3, 2021, the entirety of which is incorporated herein by reference.

BACKGROUND

Mobile telecommunications networks are widely deployed to provide various communication services (e.g., voice, text messaging, data). Mobile telecommunications networks can be multiple-access networks capable of supporting multiple users by sharing the available network resources. Mobile telecommunications networks may be referred to herein simply as mobile networks.

A mobile network includes a radio access network (RAN) and a core network. The RAN and the core network function together to provide mobile devices with access to services available from one or more external packet data networks. Mobile networks are often used to provide Internet connectivity to mobile devices.

There are many different types of mobile devices that can be used in connection with a mobile network. Mobile devices have traditionally included smartphones, tablet computers, and laptop computers, but will increasingly include other types of devices such as cars, drones, industrial and agricultural machines, robots, home appliances, medical devices, and so on. In the context of mobile networks, mobile devices are often referred to as user equipment (UE).

The RAN manages the radio spectrum, making sure it is used efficiently and meets users' quality-of-service (QoS) requirements. The RAN includes a plurality of base stations that communicate wirelessly with UEs and enable the UEs to wirelessly connect to the mobile network. A base station can provide wireless connectivity for UEs within a particular geographic area, which can be referred to as a "cell." Each base station establishes the wireless channel for a subscriber's UE upon power-up or upon handover when the UE is active. This wireless channel is often described as being associated with a session and as providing a bearer service. This wireless channel can be released when the UE remains idle for a predetermined period of time.

The core network performs a variety of functions, including providing Internet protocol (IP) connectivity for both data and voice services, ensuring this connectivity fulfills the promised QoS requirements, ensuring that the UEs are properly authenticated, tracking user mobility to ensure uninterrupted service, and tracking subscriber usage for billing and charging.

Mobile networks have undergone significant changes over the past several decades. The first two generations of mobile networks supported voice and then text messaging. Third generation (3G) networks initiated the transition to broadband access, supporting data rates typically measured in hundreds of kilobits-per-second. Fourth generation (4G) networks supported data rates that were significantly faster, typically measured in megabits-per-second. Today, the industry is transitioning from 4G to fifth generation (5G) networks, with the promise of significant increases in data rates.

The Third Generation Partnership Project (3GPP) is a consortium of a number of standards organizations that develop protocols for mobile telecommunications. 3GPP is responsible for the development of Long-Term Evolution (LTE) and related 4G standards, including LTE Advanced and LTE Advanced Pro. 3GPP is also responsible for the development of 5G standards. 5G systems are already being deployed and are expected to become widespread in the near future.

One significant advantage of 5G systems is that they will have greater bandwidth, thereby providing faster data transfer speeds. Due to the increased bandwidth, it is expected that 5G systems will facilitate many new applications in areas of technology such as Internet of Things (IoT) devices, machine-to-machine communication, autonomous vehicles, immersive user interfaces (e.g., augmented reality and virtual reality systems), and so forth.

The 5G system architecture is significantly different from its predecessors in many respects. For example, in a 5G system, network management can be software driven, and network functions and resources can be virtualized at the edges and inside the network core. A 5G system implementation can be based on cloud-native applications, virtualized network functions, and microservices-based design patterns. In addition, a 5G system implementation can provide support for stateless network functions by decoupling compute and storage.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One aspect of the present disclosure is a method for improving availability of a type of network element in a mobile network, wherein the method is implemented by a network element anycast set in a core network of the mobile network. The network element anycast set comprises a first network element instance and a second network element instance. The method comprises receiving a first message from a first source network element at the first network element instance. The first message is addressed to an anycast address that is assigned to the network element anycast set. The method also comprises processing the first message by the first network element instance. The method also comprises accessing, by the first network element instance, an anycast set data store in relation to processing the first message. The method also comprises receiving a second message from the first source network element at the second network element instance when the first network element instance is unavailable. The second message is also addressed to the anycast address. The method also comprises processing the second message by the second network element instance. The method also comprises accessing, by the second network element instance, the anycast set data store in relation to processing the second message.

In some embodiments, the method can further comprise receiving an additional message from a second source network element at the second network element instance when the first network element instance is available. The additional message can also be addressed to the anycast address. The method can also further comprise processing the additional message by the second network element instance. The method can also further comprise accessing, by the second network element instance, the anycast set data store in relation to processing the additional message.

In some embodiments, the anycast IP address can be distinct from a first IP address associated with the first network element and a second IP address associated with the second network element.

In some embodiments, the type of network element is unable to operate as a network function set.

In some embodiments, the first network element instance can comprise a first instance of a combined session management function and control plane packet gateway (SMF+PGW-C), and the second network element instance can comprise a second instance of the SMF+PGW-C.

In some embodiments, the first network element instance can comprise a first instance of a combined session management function, control plane packet gateway, and gateway GPRS support node (SMF+PGW-C+GGSN), and the second network element instance can comprise a second instance of the SMF+PGW-C+GGSN.

In some embodiments, the first network element instance can comprise a first instance of a packet gateway (PGW), and the second network element instance can comprise a second instance of the PGW.

In some embodiments, the first network element instance can comprise a first instance of a serving gateway (SGW), and the second network element instance can comprise a second instance of the SGW.

Another aspect of the present disclosure is a method for improving availability of a type of network element in a mobile network, wherein the method is implemented by at least one networking device that interconnects a first source network element and a network element anycast set. The network element anycast set comprises a first network element instance and a second network element instance. The method comprises receiving a first message from the first source network element. The first message is addressed to an anycast set address that is associated with the network element anycast set. The method also comprises routing the first message along a first path that leads to the first network element instance. The routing is based at least in part on a routing policy. The method also comprises determining that the first network element instance is unavailable. The method also comprises receiving a second message from the first source network element when the first network element instance is unavailable. The second message is addressed to the anycast set address. The method also comprises routing the second message along a second path that leads to the second network element instance based at least in part on the routing policy.

In some embodiments, the method can further comprise receiving an additional message from a second source network element when the first network element instance is available. The additional message can also be addressed to the anycast address. The method can also further comprise routing the second message along an additional path that leads to the second network element instance based at least in part on the routing policy.

In some embodiments, the anycast IP address can be distinct from a first IP address associated with the first network element and a second IP address associated with the second network element.

In some embodiments, the type of network element is unable to operate as a network function set.

In some embodiments, the first network element instance comprises a first instance of a combined session management function and control plane packet gateway (SMF+PGW-C), and the second network element instance comprises a second instance of the SMF+PGW-C.

In some embodiments, the first network element instance comprises a first instance of a combined session management function, control plane packet gateway, and gateway GPRS support node (SMF+PGW-C+GGSN), and the second network element instance comprises a second instance of the SMF+PGW-C+GGSN.

In some embodiments, the first network element instance comprises a first instance of a packet gateway (PGW), and the second network element instance comprises a second instance of the PGW.

In some embodiments, the first network element instance comprises a first instance of a serving gateway (SGW), and the second network element instance comprises a second instance of the SGW.

Another aspect of the present disclosure is a system for improving availability of a type of network element in a mobile network. The system comprises one or more processors and memory in electronic communication with the one or more processors. An anycast address is stored in the memory. The anycast address is assigned to a network element anycast set comprising a first network element instance and a second network element instance. An anycast set data store is also included in the memory. The anycast set data store is accessible to the first network element instance and the second network element instance. Instructions are also stored in the memory. The instructions are executable by the one or more processors to receive a first message from a first source network element at the first network element instance. The first message is addressed to the anycast address. The instructions are also executable by the one or more processors to process the first message by the first network element instance. The instructions are also executable by the one or more processors to access, by the first network element instance, the anycast set data store in relation to processing the first message. The instructions are also executable by the one or more processors to receive a second message from the first source network element at the second network element instance when the first network element instance is unavailable. The second message is also addressed to the anycast address. The instructions are also executable by the one or more processors to process the second message by the second network element instance. The instructions are also executable by the one or more processors to access, by the second network element instance, the anycast set data store in relation to processing the second message.

In some embodiments, the memory can further comprise additional instructions that are executable by the one or more processors to receive an additional message from a second source network element at the second network element instance when the first network element instance is available. The additional message can also be addressed to the anycast address. The memory can also further comprise additional instructions that are executable by the one or more processors to process the additional message by the second network element instance. The memory can also further comprise additional instructions that are executable by the one or more processors to access, by the second network element instance, the anycast set data store in relation to processing the additional message.

In some embodiments, the anycast IP address can be distinct from a first IP address associated with the first network element and a second IP address associated with the second network element.

In some embodiments, the type of network element is unable to operate as a network function set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
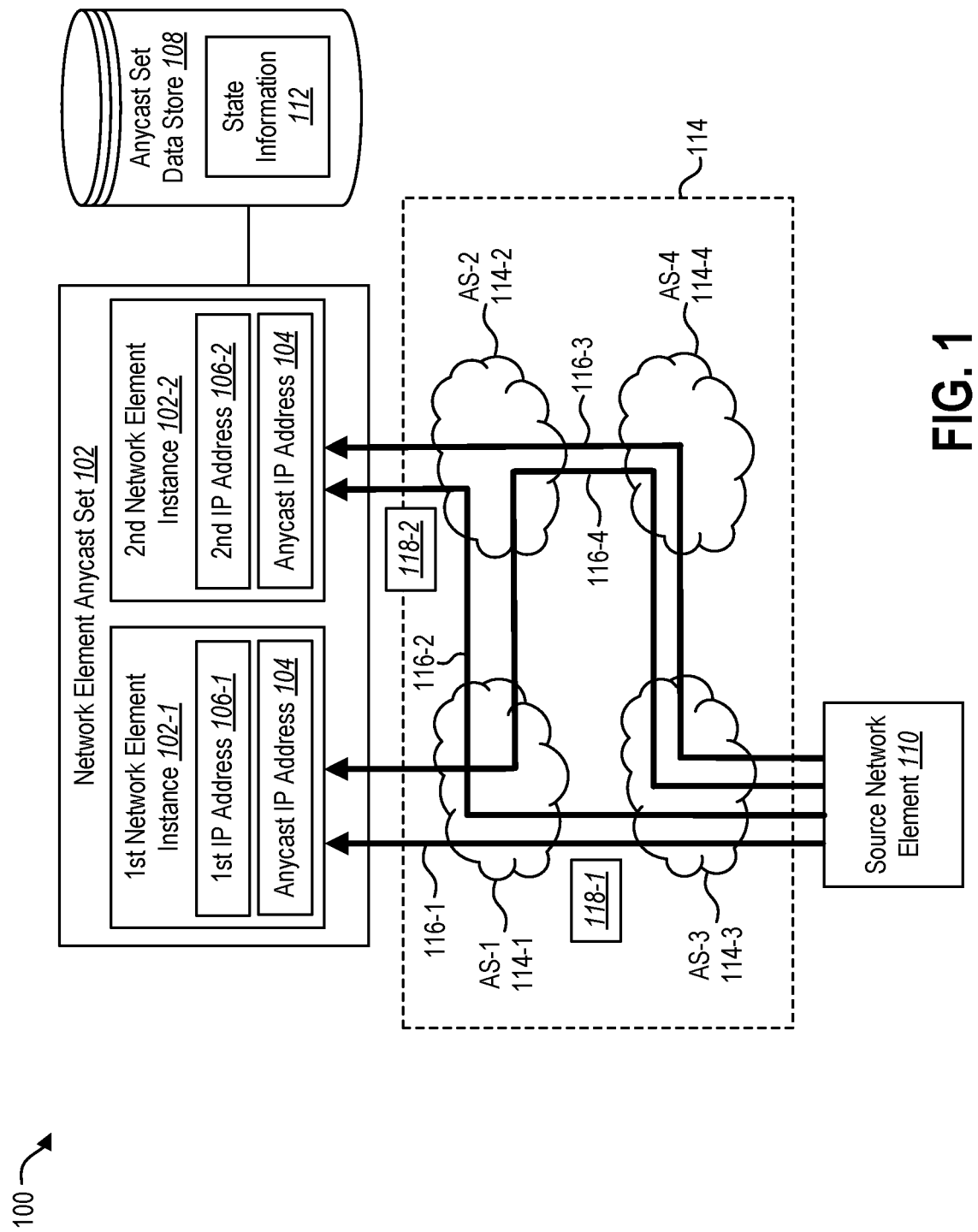
FIG. 1 illustrates an example of a system in which the techniques disclosed herein can be utilized.

In a 5G network, the core network is sometimes referred to as the Next Generation (NG) core, or simply as the 5G core. The 5G core adopts a microservice-like architecture that includes many different network functions (NFs). A network function (NF) can refer to a functional building block within a network infrastructure. An NF can have well-defined external interfaces and well-defined functional behavior.

3GPP Release 16 introduced the concept of an NF set. An NF set is a group of interchangeable NF instances of the same type. For example, the NF instances in the same NF set can support the same services and the same network segment(s) (e.g., the same network slice(s)). The NF instances in the same NF set can be geographically distributed but have access to the same context data. The context data can be shared in any suitable way, for instance via an Unstructured Data Storage Function (UDSF).

An NF set can improve the availability of a particular type of NF. For example, a plurality of instances of a Session Management Function (SMF) can be configured as an NF set. This improves the availability of the SMF within a mobile network. When a particular instance of an SMF is no longer available, another instance of the SMF within the SMF set can take the place of the SMF instance that is no longer available.

The concept of an NF set is not defined for 4G (or earlier) network elements. Moreover, the concept of an NF set cannot easily be adapted to 4G (or earlier) network elements.

For example, in a 3GPP defined NF set, each NF instance (e.g., SMF instance) has its own node IP address for the service based interface (SBI). Each NF instance also has its own IP address for the packet forwarding control protocol (PFCP) interface. 3GPP has defined ways to communicate to peer NFs on these interfaces about alternative instances to reach in the event of one instance failure.

For 4G network elements that use the General Packet Radio Service (GPRS) Tunneling Protocol for the control plane (GTP-C), there is no way to communicate to peers about an alternative location to reach in the event of a failure of a particular instance of a network element. Thus, up to this point, it has not been possible to configure 4G network elements such as a packet gateway (PGW) and a serving gateway (SGW) as an NF set. The present disclosure is generally related to providing functionality similar to that of an NF set for 4G (and earlier) network elements, such as PGWs and SGWs. In other words, the techniques disclosed herein are related to providing 5G NF set-like capabilities for network elements corresponding to previous generations (4G and earlier) of wireless technology. Thus, the techniques disclosed herein can be used to adapt the 5G concept of an NF set to pre-5G network elements. This can improve availability of network elements that are unable to operate as an NF set.

The techniques disclosed herein involve the use of the IP anycast routing mechanism. IP anycast is a network addressing and routing methodology in which a single destination IP address has multiple routing paths to two or more endpoint destinations. In other words, anycast addressing is a one-to-one-of-many association where datagrams are routed to any single member of a group of potential receivers that are all identified by the same destination address. The routing algorithm selects a single receiver from the group based on a least-expensive routing metric.

In accordance with the present disclosure, the techniques disclosed herein can enable a plurality of instances of the same type of network element to be configured as a set that is analogous to an NF set. This type of set may be referred to herein as an "anycast set."

Advantageously, an anycast set can provide many of the same technical benefits as an NF set. For instance, an anycast set can improve the availability of a particular type of network element. As an example, the techniques disclosed herein can enable a plurality of instances of a combined SMF and control plane PGW (SMF+PGW–C) to be configured as an anycast set. This improves the availability of the SMF+PGW–C within the mobile network. When a particular instance of an SMF+PGW–C is no longer available, another instance of the SMF+PGW–C within the anycast set can take the place of the SMF+PGW–C instance that is no longer available.

Of course, the techniques disclosed herein can be applied to other types of network elements as well. In fact, the techniques disclosed herein can be applied to any type of element in a core network that communicates using a connectionless protocol.

The PGW–C portion of an SMF+PGW–C uses the General Packet Radio Service (GPRS) Tunneling Protocol (GTP) for communication with other network elements. GTP uses the User Datagram Protocol (UDP), which is a connectionless transport protocol. Thus, a plurality of instances of an SMF+PGW–C network function can be configured as an anycast set in accordance with the techniques disclosed herein.

As another example, the techniques disclosed herein can enable a plurality of instances of a standalone PGW and/or a standalone SGW to be configured as an anycast set. As another example, the techniques disclosed herein can enable a plurality of instances of a combined SMF+PGW–C and Gateway GPRS Support Element (GGSN) to be configured as an anycast set. Those skilled in the art will recognize other examples of network elements that can utilize the techniques disclosed herein.

FIG. 1 illustrates an example of a system 100 in which the techniques disclosed herein can be utilized. The system 100 includes a network element anycast set 102. The network element anycast set 102 is an anycast set for a particular type of network element. The network element can be any of the specific types of network elements described previously (e.g., an SMF+PGW–C, an SMF+PGW–C/GGSN, a standalone PGW, a standalone SGW) or any other network element that is part of a core network and that communicates using a connectionless protocol.

In the depicted example, the network element anycast set 102 includes a first network element instance 102-1 and a second network element instance 102-2. The first network element instance 102-1 is a first instance of a particular type of network element, and the second network element instance 102-2 is a second instance of the same type of network element. For example, the first network element instance 102-1 could be a first instance of an SMF+PGW–C network element, and the second network element instance 102-2 could be a second instance of the SMF+PGW–C network element.

For simplicity, the network node anycast set 102 includes only two different instances of the same type of network element. However, this should not be interpreted as limiting the scope of the present disclosure; an anycast set in accordance with the present disclosure could include more than two instances of the same type of network element.

An IP address is assigned to the network element anycast set 102. The IP address that is assigned to the network element anycast set 102 may be referred to herein as an anycast IP address 104. In some embodiments, the anycast IP address 104 can be used as the IP address for the GTP-C protocol. In other words, any messages that are sent to the network element anycast set 102 via the GTP-C protocol can be addressed to the anycast IP address 104.

Each network element instance in the network element anycast set 102 can also be assigned its own IP address. In the depicted example, the first network element instance 102-1 is shown with a first IP address 106-1, and the second network element instance 102-2 is shown with a second IP address 106-2.

An anycast set data store 108 can be provided for the network element anycast set 102. The anycast set data store 108 can be used to store information that is accessible to all members of the network element anycast set 102. In some embodiments (e.g., in a 5G network), the anycast set data store 108 can be implemented as an unstructured data storage function (UDSF).

The depicted example is related to a scenario in which another network element sends messages to the network element anycast set 102. The network element that sends the messages may be referred to herein as a source network element 110. There are many different types of network elements that could be the source network element 110. For example, in an embodiment where the first network element instance 102-1 and the second network element instance 102-2 are different instances of an SMF+PGW–C, the source network element 110 could be an SGW.

The anycast set data store 108 can be used to store information that is relevant to transactions involving the network element anycast set 102 and other network elements, such as the source network element 110. Such information is represented in FIG. 1 as state information 112. In some embodiments, the state information 112 can include information about a session that has been established when a UE attaches to the mobile network that the various network elements are part of.

The source network element 110 is in electronic communication with the network elements in the network element anycast set 102 (i.e., the first network element instance 102-1 and the second network element instance 102-2) via one or more networking devices, such as routers. For purposes of example, a plurality of autonomous systems 114 are shown between the source network element 110 and the network element anycast set 102. These autonomous systems 114 may be referred to as AS-1 114-1, AS-2 114-2, AS-3 114-3, and AS-4 114-4. Of course, the number of autonomous systems 114 shown in FIG. 1 is provided for purposes of example only and should not be interpreted as limiting the scope of the present disclosure.

In this context, the term "autonomous system" can refer to a collection of networking devices whose prefixes and routing policies are under common administrative control. An autonomous system (AS) can be operated by, for example, a network service provider, a large company, a university, a division of a company, a group of companies, or the like. An autonomous system can represent a connected group of one or more blocks of IP addresses, called IP prefixes, that have been assigned to a particular organization and that provide a single routing policy to other systems outside the autonomous system.

The term "networking device" can refer to electronic devices that are used to facilitate communication and interaction between devices on a computer network. Some examples of networking devices include routers, gateways, switches, bridges, repeaters, and hubs.

Networking devices within an autonomous system (AS) use an Interior Gateway Protocol (IGP), which handles routing between nodes inside the autonomous system. Some examples of IGPs include the Routing Information Protocol (RIP), the Open Shortest Path First (OSPF) protocol, the Intermediate System to Intermediate System (IS-IS) protocol, the Enhanced Interior Gateway Routing Protocol (EIGRP), and the Interior Gateway Routing Protocol (IGRP). Routing within an autonomous system (intra-AS routing) is internal to that autonomous system and invisible to those outside it. An administrator of an autonomous system decides what routing algorithm should run within it.

An Exterior Gateway Protocol (EGP) is a routing protocol that handles routing between autonomous systems (inter-AS routing). Some examples of EGPs include the Border Gateway Protocol (BGP) and the Inter-Domain Routing Protocol (IDRP).

In the depicted example, there are four possible paths that messages sent by the source network element 110 to the anycast IP address 104 can take. A first path 116-1 is source network element 110→AS-3 114-3→AS-1 114-1→first network element instance 102-1. A second path 116-2 is source network element 110→AS-3 114-3→AS-1 114-1→AS-2 114-2→second network element instance 102-2. A third path 116-3 is source network element 110→AS-3 114-3→AS-4 114-4→AS-2 114-2→second network element instance 102-2. A fourth path 116-4 is source network element 110→AS-3 114-3→AS-4 114-4→AS-2 114-2→AS-1 114-1→first network element instance 102-1.

One of these possible paths can be selected based on one or more pre-defined routing policies. As an example, suppose that a routing policy is defined that selects the shortest path from the source to the destination. In this case, the first path 116-1 will be selected for messages that the source network element 110 sends to the anycast IP address 104. Therefore, any messages that the source network element 110 sends to the anycast IP address 104 while the first network element instance 102-1 is available will be delivered to and processed by the first network element instance 102-1. FIG. 1 shows a first message 118-1 that is sent from the source network element 110 to the anycast IP address 104. The first message 118-1 is routed along the first path 116-1 to the first network element instance 102-1 for processing.

As long as the network is stable (e.g., unchanged), the same path will be selected for each message that is sent from the source network element 110 to the anycast IP address 104. Thus, in the present example, as long as the first network element instance 102-1 is available, the first path 116-1 will be selected for any messages that the source network element 110 sends to the anycast IP address 104.

However, suppose that the first network element instance 102-1 becomes unavailable. Further suppose that, as long as the first network element instance 102-1 is unavailable, a router that applies a routing policy that prefers the shortest available path will select the second path 116-2 for messages that the source network element 110 sends to the anycast IP address 104. Therefore, any messages that the source network element 110 sends to the anycast IP address 104 while the first network element instance 102-1 is unavailable will be delivered to and processed by the second network element instance 102-2. FIG. 1 shows a second message 118-2 that is sent from the source network element 110 to the anycast IP address 104. The second message 118-2 is routed along the second path 116-2 to the second network element instance 102-2 for processing.

As noted above, in some embodiments the network element instances (the first network element instance 102-1 and the second network element instance 102-2) in the network element anycast set 102 can be a combination of a 5G network function (e.g., an SMF) and a 4G network element (e.g., a control plane PGW). In such embodiments, the network element instances can use their individual IP addresses to form an NF set when 5G service is being provided to a UE. For example, the first network element instance 102-1 and the second network element instance 102-2 can use their individual IP addresses (the first IP address 106-1 and the second IP address 106-2, respectively) to form an NF set. When 4G (or earlier) service is being provided, the network element instances can use the anycast set techniques disclosed herein.

Figure 2A:
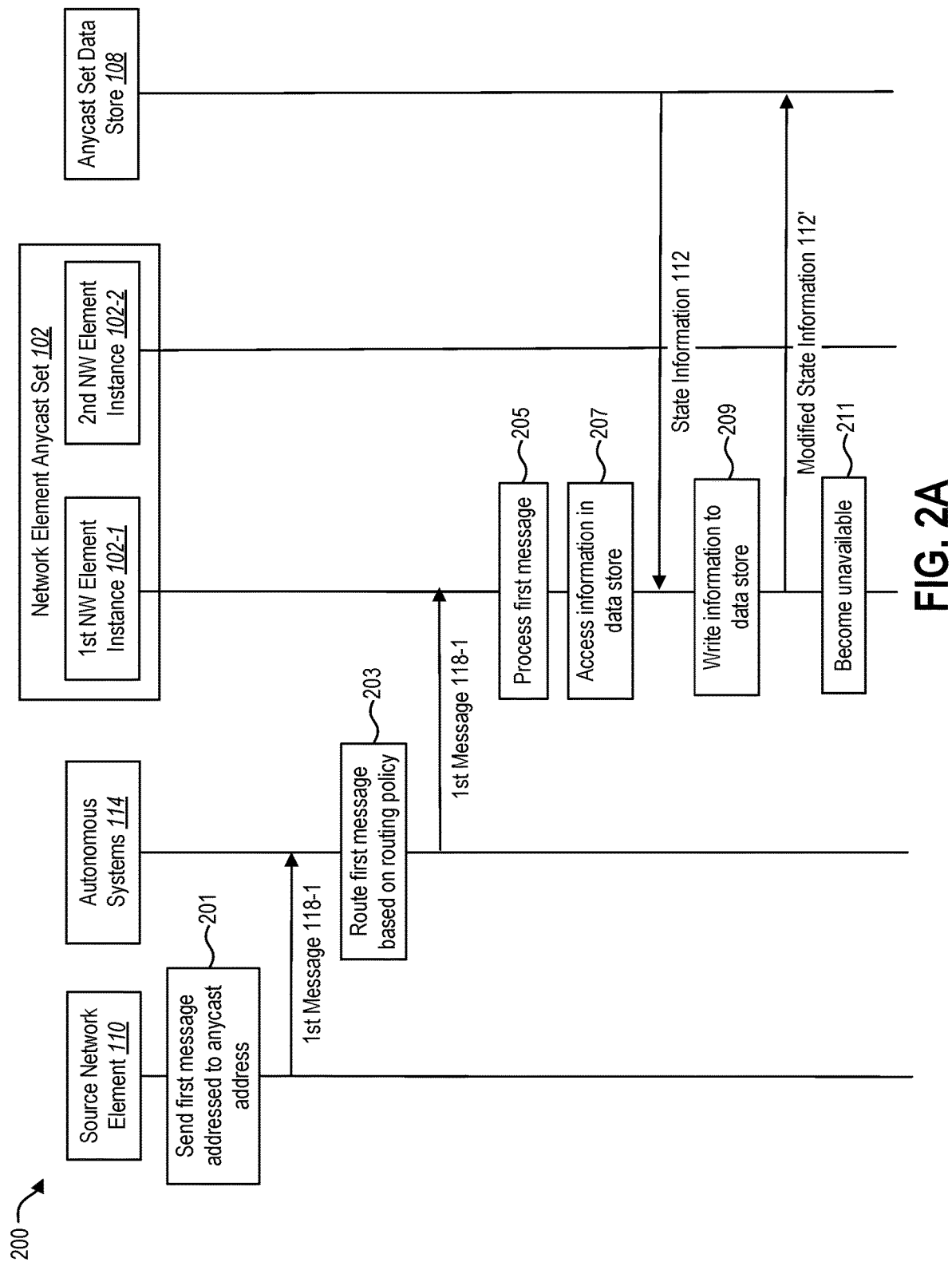
FIGS. 2A and 2B illustrate an example of a method for improving availability of a type of network element that cannot operate as a network function set.
Figure 2B:
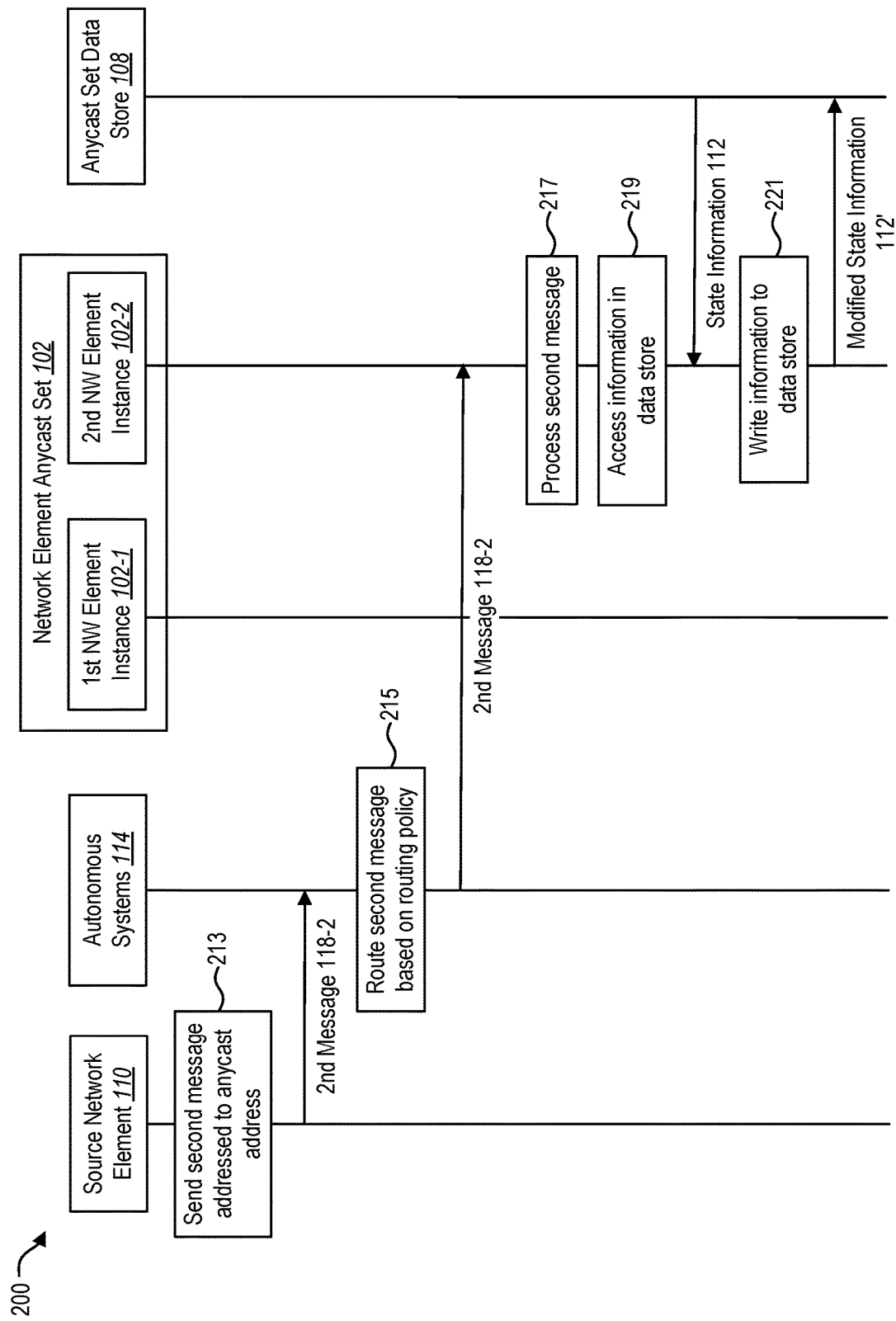

FIGS. 2A and 2B illustrate an example of a method 200 for improving availability of a type of network element that cannot operate as an NF set. For the sake of clarity, the method 200 will be described in relation to the system 100 shown in FIG. 1. In particular, the method will be described in relation to the actions of the source network element 110, the plurality of autonomous systems 114, the network element anycast set 102 (including the first network element instance 102-1 and the second network element instance 102-2), and the anycast set data store 108.

Reference is initially made to FIG. 2A. The source network element 110 sends 201 a first message 118-1 that is addressed to the anycast IP address 104. The networking devices (e.g., routers) in the autonomous systems 114 route 203 the first message 118-1 based on a pre-defined routing policy.

For purposes of the present example, it will be assumed that the first message 118-1 is routed based on a routing policy that selects the shortest path from the source to the destination. It will also be assumed that when the source network element 110 sends the first message 118-1 to the anycast IP address 104, the first network element instance 102-1 is available. As noted above, when the first network element instance 102-1 is available, a routing policy that selects the shortest path from the source to the destination causes the first path 116-1 to be selected for messages that the source network element 110 sends to the anycast IP address 104. Thus, in the depicted example, the first message 118-1 is routed from the source network element 110 to the first network element instance 102-1 along the first path 116-1.

In response to receiving the first message 118-1, the first network element instance 102-1 can process 205 the first message 118-1. In some embodiments, processing 205 the first message 118-1 can include receiving the first message 118-1 and taking at least one action in response to receiving the first message 118-1. There are many different types of actions that can be taken (e.g., storing the information that is contained in the first message 118-1 in the anycast set data store 108, sending a response to the source network element 110).

In connection with processing the first message 118-1, the first network element instance 102-1 can access 207 information in the anycast set data store 108. In some embodiments, accessing 207 information in the anycast set data store 108 can include retrieving or obtaining information from the anycast set data store 108. For example, the first network element instance 102-1 can retrieve or obtain information from the anycast set data store 108 that is relevant to the first message 118-1. FIG. 2A shows the first network element instance 102-1 retrieving state information 112 from the anycast set data store 108.

As part of processing the first message 118-1 and/or after the first message 118-1 has been processed, the first network element instance 102-1 can write information to the anycast set data store 108. FIG. 2A shows the first network element instance 102-1 writing 209 information (e.g., modified state information 112') to the anycast set data store 108.

In the present example, it will be assumed that at some point after the first network element instance 102-1 processes the first message 118-1, the first network element instance 102-1 becomes 211 unavailable. There are several possible reasons why the first network element instance 102-1 could become unavailable. For example, the first network element instance 102-1 could become unavailable due to a failure of the first network element instance 102-1. As another example, a network operator could intentionally make the first network element instance 102-1 unavailable by taking the first network element instance 102-1 offline (e.g., in order to perform a maintenance operation).

Reference is now made to FIG. 2B. The source network element 110 sends 213 a second message 118-2 that is addressed to the anycast IP address 104. The networking devices (e.g., routers) in the autonomous systems 114 route 215 the second message 118-2 based on the same predefined routing policy that was used to route the first message 118-1. In the present example, this means that the second message 118-2 is routed based on a routing policy that selects the shortest path from the source to the destination.

As noted above, in the present example it will be assumed that when the first network element instance 102-1 is unavailable, a routing policy that selects the shortest path from the source to the destination causes the second path 116-2 to be selected for messages that the source network element 110 sends to the anycast IP address 104. Thus, because the first network element instance 102-1 has become unavailable, the second message 118-2 is routed 215 from the source network element 110 to the second network element instance 102-2 along the second path 116-2.

In response to receiving the second message 118-2, the second network element instance 102-2 can process 217 the second message 118-2. The second network element instance 102-2 can access 219 information in the anycast set data store 108 in connection with processing the second message 118-2. FIG. 2B shows the second network element instance 102-2 retrieving state information 112 from the anycast set data store 108.

As part of processing the second message 118-2 and/or after the second message 118-2 has been processed, the second network element instance 102-2 can write information to the anycast set data store 108. FIG. 2B shows the second network element instance 102-2 writing 221 information (e.g., modified state information 112') to the anycast set data store 108.

The method 200 shown in FIGS. 2A and 2B demonstrates how different network element instances within a network element anycast set 102 can receive and process messages that are sent by the same source network element 110. In particular, the source network element 110 sends both the first message 118-1 and the second message 118-2 to the anycast IP address 104 associated with the network element anycast set 102. The first message 118-1 is processed by the first network element instance 102-1. The second message 118-2 is processed by the second network element instance 102-2.

The method 200 shown in FIGS. 2A and 2B also demonstrates how different network element instances that are part of the same network element anycast set 102 can access information from the same anycast set data store 108. In particular, the first network element instance 102-1 accesses information from the anycast set data store 108 in connection with processing the first message 118-1 from the source network element 110, and the second network element instance 102-2 accesses information from the anycast set data store 108 in connection with processing the second message 118-2 from the source network element 110. In some situations, the information in the anycast set data store 108 that is accessed by the first network element instance 102-1 can be the same as the information in the anycast set data store 108 that is accessed by the second network element instance 102-2. Alternatively, at least some of the information in the anycast set data store 108 that is accessed by the first network element instance 102-1 can be different from the information in the anycast set data store 108 that is accessed by the second network element instance 102-2.

Although an anycast set as disclosed herein is analogous to an NF set in a 5G mobile network, there can be some differences between the way that an anycast set is implemented and the way that an NF set is implemented. For example, in a 5G mobile network, a network element that communicates with an NF instance in an NF set is aware that the NF instance is part of the NF set. In addition, a network element that communicates with an NF instance in an NF set knows the IP addresses of each NF instance in the NF set, and the network element addresses messages to specific NF instances. In contrast, a network element that communicates with an anycast set as disclosed herein does not necessarily know that it is communicating with an anycast set. A network element that communicates with an anycast set as disclosed herein also does not need to know the IP addresses of the individual network element instances that are part of the anycast set. A network element can communicate with an anycast set as disclosed herein as long as the network element is aware of the anycast IP address.

In the above example, it has been assumed that the selection of a path has been based on a routing policy that selects the shortest path from the source to the destination. However, this should not be interpreted as limiting the scope of the present disclosure. A routing policy in accordance with the present disclosure can be based on many different factors. Any suitable routing protocol, including any of the routing protocols described above, can be used in connection with the techniques disclosed herein.

Figure 3:
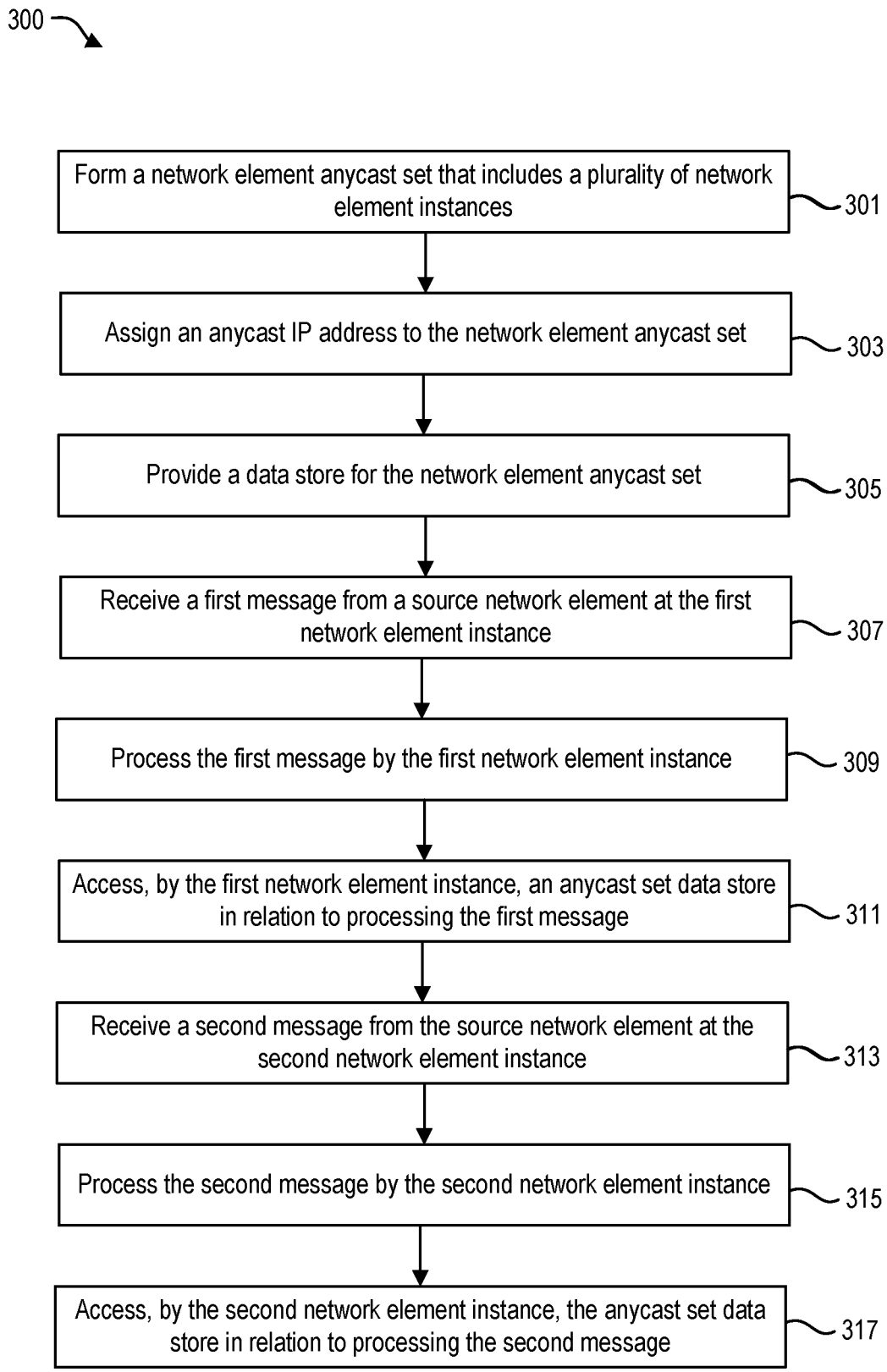
FIG. 3 illustrates an example of a method that can be implemented by a network element anycast set in a core network of a mobile telecommunications network.

FIG. 3 illustrates an example of a method 300 that can be implemented by a network element anycast set 102 in a core network of a mobile telecommunications network. For the sake of clarity, the method 300 will be described in relation to the system 100 that is shown in FIG. 1. Thus, in the depicted method 300, it will be assumed that the network element anycast set 102 includes a first network element instance 102-1 and a second network element instance 102-2.

The method 300 includes forming 301 the network element anycast set 102. The method 300 also includes assigning 303 an anycast IP address 104 to the network element anycast set 102 and providing 305 an anycast set data store 108 for the network element anycast set 102.

The method 300 also includes receiving 307 a first message 118-1 from a source network element 110 at the first network element instance 102-1. The first message 118-1 can be addressed to the anycast IP address 104 that has been assigned to the network element anycast set 102.

In response to receiving 307 the first message 118-1, the first network element instance 102-1 can process 309 the first message 118-1. The first network element instance 102-1 can also access 311 an anycast set data store 108 in relation to processing 309 the first message 118-1. Accessing 311 the anycast set data store 108 can include reading information from and/or writing information to the anycast set data store 108.

At some point after the first network element instance 102-1 processes 309 the first message 118-1, the first network element instance 102-1 can become unavailable. As discussed above, there are several possible reasons why the first network element instance 102-1 could become unavailable.

The method 300 can also include receiving 313 a second message 118-2 from the source network element 110 at the second network element instance 102-2. The second message 118-2 can be received after the first network element instance 102-1 has become unavailable. Like the first message 118-1, the second message 118-2 can be addressed to the anycast IP address 104 that has been assigned to the network element anycast set 102. However, because the first network element instance 102-1 has become unavailable, the second message 118-2 can be received 313 at the second network element instance 102-2.

In response to receiving 313 the second message 118-2, the second network element instance 102-2 can process 315 the second message 118-2. The second network element instance 102-2 can also access 317 an anycast set data store 108 in relation to processing 315 the second message 118-2. Accessing 317 the anycast set data store 108 can include reading information from and/or writing information to the anycast set data store 108.

Figure 4:
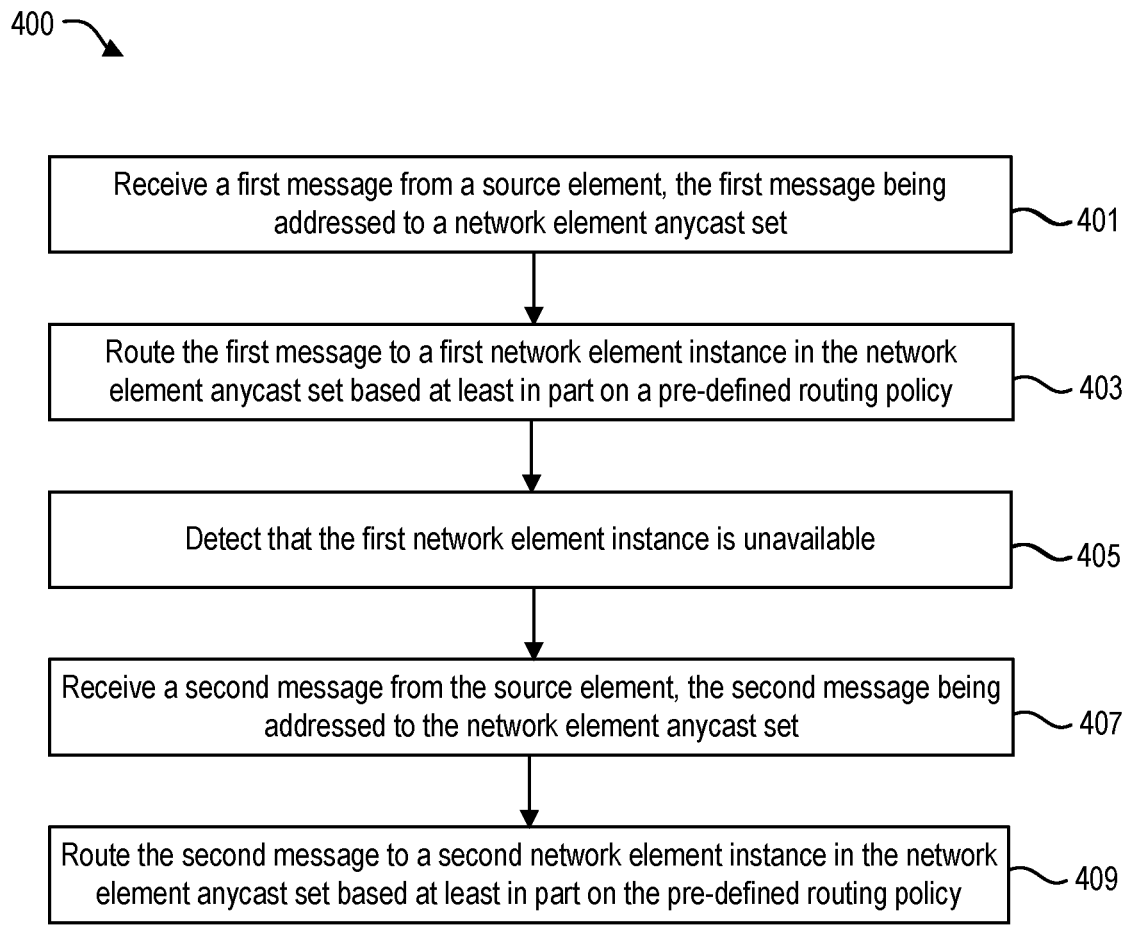
FIG. 4 illustrates an example of a method that can be implemented by the networking devices (e.g., routers) in one or more autonomous systems that interconnect a source network element and the members of a network element anycast set.

FIG. 4 illustrates an example of a method 400 that can be implemented by the networking devices (e.g., routers) in the autonomous systems 114 that interconnect the source network element 110 and the members of the network element anycast set 102. Once again, for the sake of clarity, the method 400 will be described in relation to the system 100 that is shown in FIG. 1. Thus, in the depicted method 400, it will be assumed that the network element anycast set 102 includes a first network element instance 102-1 and a second network element instance 102-2.

The method 400 can include receiving 401 a first message 118-1 from the source network element 110. The first message 118-1 is addressed to an anycast IP address 104 that is associated with the network element anycast set 102.

The first message 118-1 can be routed based on a pre-defined routing policy. For purposes of the present method 400, it will be assumed that the routing policy will cause the first message 118-1 to be routed along a path (e.g., the first path 116-1 shown in FIG. 1) that leads to the first network element instance 102-1 when the first network element instance 102-1 is available. Thus, the method 400 can include routing 403 the first message 118-1 to the first network element instance 102-1 based at least in part on the pre-defined routing policy. The action of routing 403 the first message 118-1 to the first network element instance 102-1 can involve a plurality of networking devices (e.g., routers), which together form a path from the source network element 110 to the first network element instance 102-1. Each networking device can forward the message to the next hop along the path, which is either another networking device or, ultimately, the computing device(s) on which the first network element instance 102-1 is running.

At some point, the first network element instance 102-1 may become unavailable, and the method 400 can include detecting 405 that the first network element instance 102-1 is unavailable. In some embodiments, detecting 405 that the first network element instance 102-1 is unavailable can include receiving a notification that the first network element instance 102-1 is unavailable. Alternatively, detecting that the first network element instance 102-1 is unavailable can include inferring that the first network element instance 102-1 is unavailable based on one or more events (e.g., not receiving an acknowledgement message within a pre-defined time period).

The method 400 can also include receiving 407 a second message 118-2 from the source network element 110. Like the first message 118-1, the second message 118-2 can be addressed to an anycast IP address 104 that is associated with the network element anycast set 102.

The second message 118-2 can be routed based on the same pre-defined routing policy as the first message 118-1. For purposes of the present method 400, it will be assumed that the routing policy will cause the second message 118-2 to be routed along a path (e.g., the second path 116-2 shown in FIG. 1) that leads to the second network element instance 102-2 when the first network element instance 102-1 is unavailable. Thus, the method 400 can include routing 409 the second message 118-2 to the second network element instance 102-2 based at least in part on the pre-defined routing policy. The action of routing 409 the second message 118-2 to the second network element instance 102-2 can involve a plurality of networking devices (e.g., routers), which together form a path from the source network element 110 to the second network element instance 102-2. Each networking device can forward the message to the next hop along the path, which is either another networking device or, ultimately, the computing device(s) on which the second network element instance 102-2 is running.

Figure 5A:
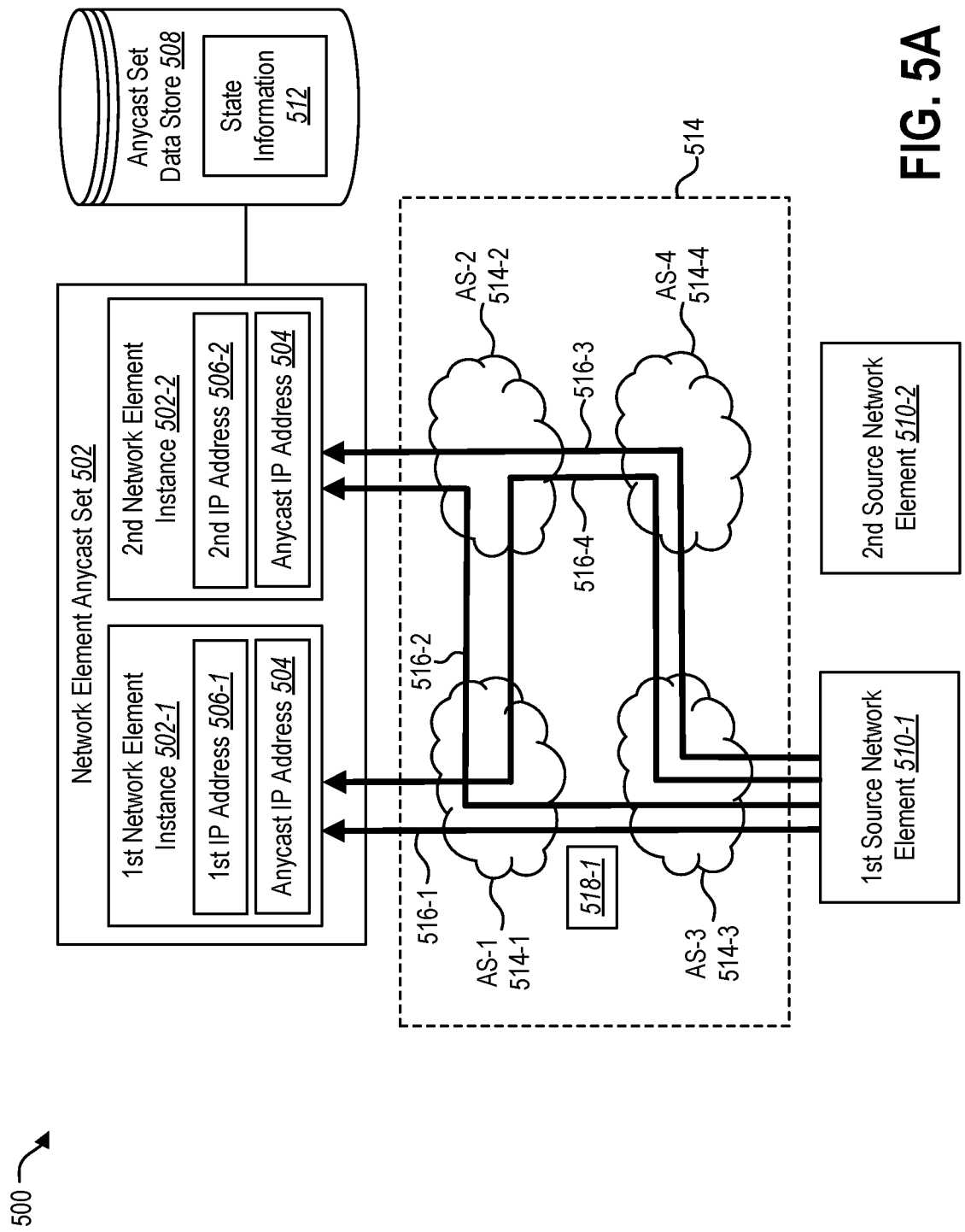
FIGS. 5A and 5B illustrate another example of a system in which the techniques disclosed herein can be utilized.
Figure 5B:
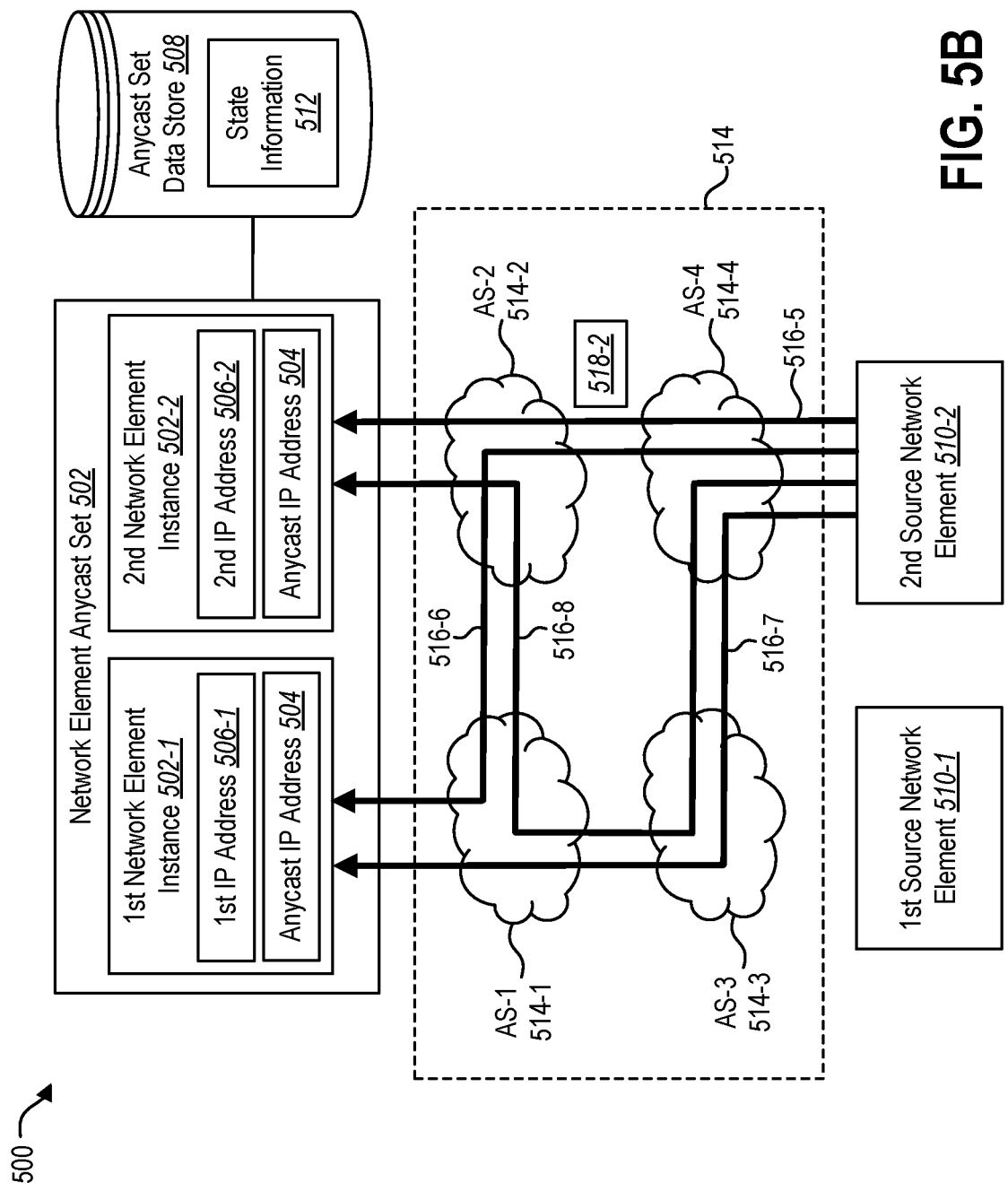

FIGS. 5A and 5B illustrate another example of a system 500 in which the techniques disclosed herein can be utilized. The example shown in FIGS. 5A and 5B is similar in many respects to the example described previously in connection with FIG. 1. The example involves a network element anycast set 502 that includes a first network element instance 502-1 and a second network element instance 502-2. An anycast IP address 504 is assigned to the network element anycast set 502. The anycast IP address 504 is distinct from addresses of the individual network element instances that are part of the network element anycast set 502. In particular, the anycast IP address 504 is distinct from a first IP address 506-1 that is assigned to the first network element instance 502-1 and a second IP address 506-2 that is assigned to the second network element instance 502-2. An anycast set data store 508 is provided to store information (e.g., state information 512) that is accessible to all members of the network element anycast set 502.

The depicted example is related to a scenario in which a plurality of different source network elements send messages to the network element anycast set 502. In particular, the depicted example involves a first source network element 510-1 and a second source network element 510-2 sending messages to the network element anycast set 502.

The anycast set data store 508 can be used to store information that is relevant to transactions involving the network element anycast set 502 and other network elements, such as the first source network element 510-1 and the second source network element 510-2. Such information is represented in FIGS. 5A and 5B as state information 512.

As before, a plurality of autonomous systems 514 are shown between the source network element 510 and the network element instances that constitute the network element anycast set 502 (i.e., the first network element instance 502-1 and the second network element instance 502-2). These autonomous systems 514 may be referred to as AS-1 514-1, AS-2 514-2, AS-3 514-3, and AS-4 514-4.

In the depicted example, there are four possible paths that messages sent by the first source network element 510-1 to the anycast IP address 504 can take. These paths are shown in FIG. 5A. A first path 516-1 is first source network element 510-1→AS-3 514-3→AS-1 514-1→first network element instance 502-1. A second path 516-2 is first source network element 510-1→AS-3 514-3→AS-1 514-1→AS-2 514-2→second network element instance 502-2. A third path 516-3 is first source network element 510-1→AS-3 514-3→AS-4 514-4→AS-2 514-2→second network element instance 502-2. A fourth path 516-4 is first source network element 510-1→AS-3 514-3→AS-4 514-4→AS-2 514-2→AS-1 514-1→first network element instance 502-1.

As in the previous example, it will be assumed that one of these possible paths will be selected based on a routing policy that selects the shortest path from the source to the destination. Thus, as long as the first network element instance 502-1 is available, the first path 516-1 will be selected for messages that the first source network element 510-1 sends to the anycast IP address 504. On the other hand, if the first network element instance 502-1 is unavailable, the second path 516-2 will be selected for messages that the first source network element 510-1 sends to the anycast IP address 504.

In addition to the four possible paths described above, there are an additional four possible paths that messages sent by the second source network element 510-2 to the anycast IP address 504 can take. These additional paths are shown in FIG. 5B. A fifth path 516-5 is second source network element 510-2→AS-4 514-4→AS-2 514-2→second network element instance 502-2. A sixth path 516-6 is second source network element 510-2→AS-4 514-4→AS-2 514-2→AS-1 514-1→first network element instance 502-1. A seventh path 516-7 is second source network element 510-2→AS-4 514-4→AS-3 514-3→AS-1 514-1→first network element instance 502-1. An eighth path 516-8 is second source network element 510-2→AS-4 514-4→AS-3 514-3→AS-1 514-1→AS-2 514-2→second network element instance 502-2.

Continuing with the assumption that one of these possible paths will be selected based on a routing policy that selects the shortest path from the source to the destination, the fifth path 516-5 will be selected for messages that the second source network element 510-2 sends to the anycast IP address 504 as long as the second network element instance 502-2 is available. However, if the second network element instance 502-2 is unavailable, the sixth path 516-6 will be selected for messages that the second source network element 510-2 sends to the anycast IP address 504.

Figure 6A:
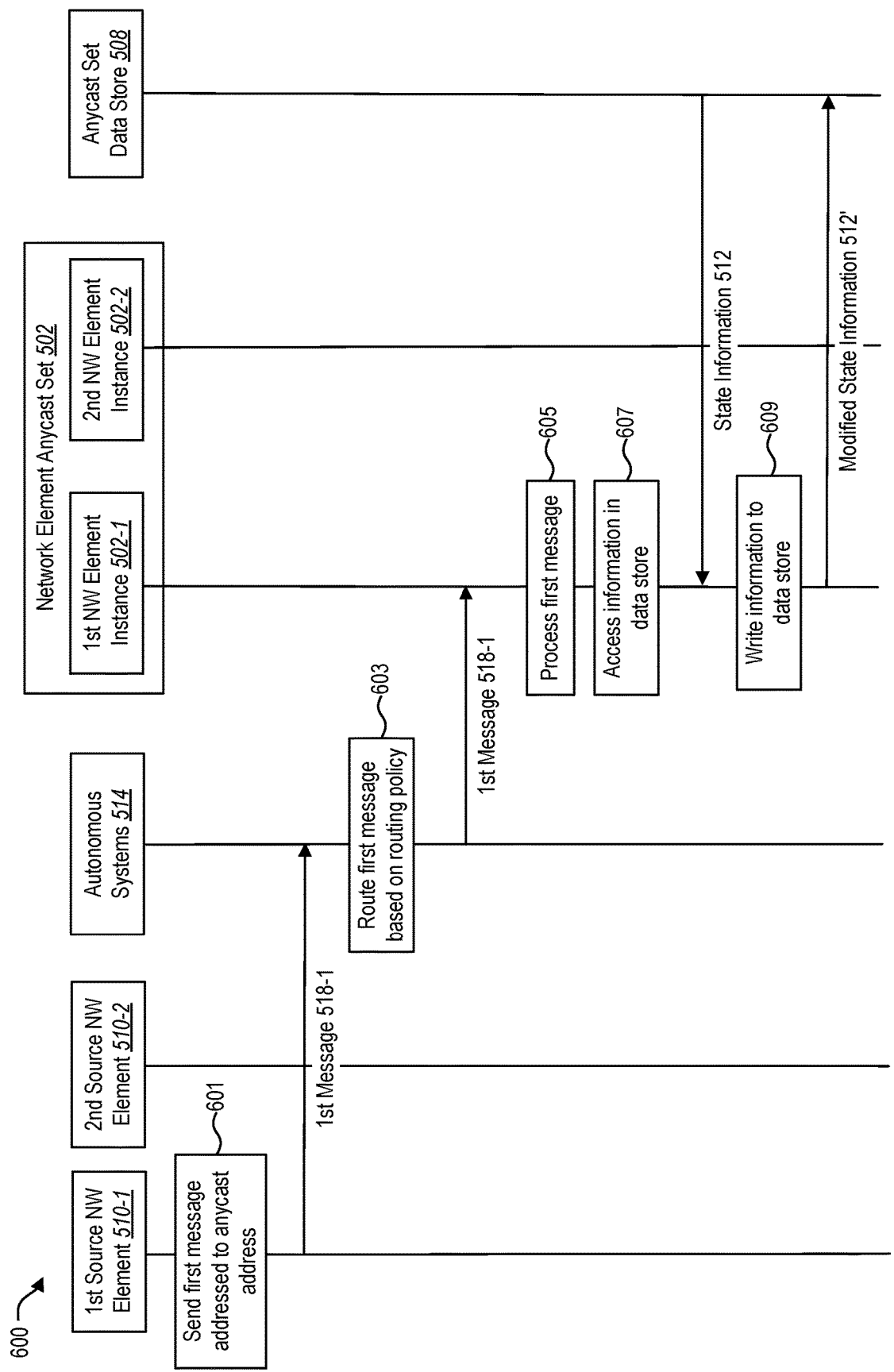
FIGS. 6A and 6B illustrate another example of a method for improving availability of a type of network element that cannot operate as a network function set.
Figure 6B:
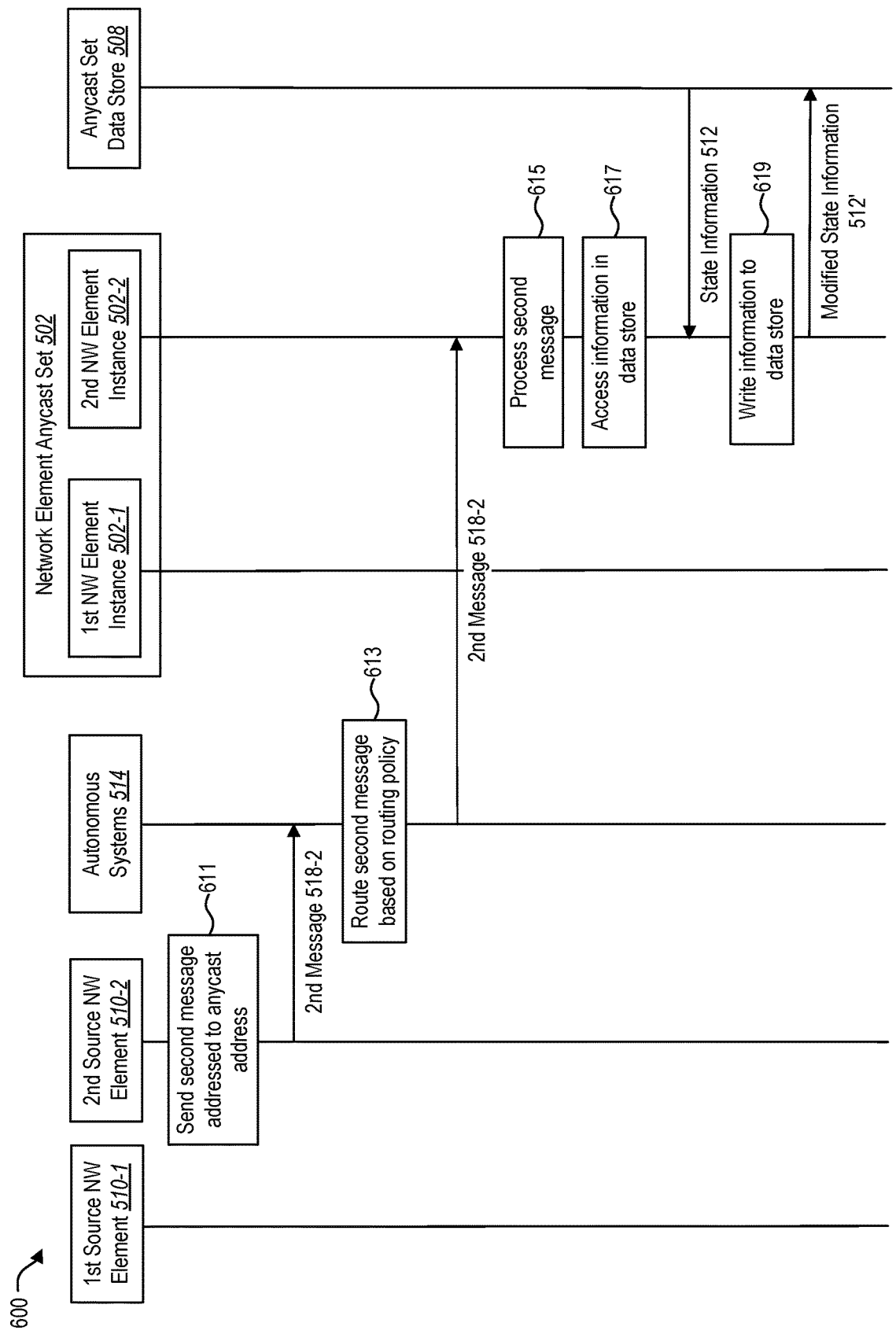

FIGS. 6A and 6B illustrate an example of a method 600 for improving availability of a type of network element that cannot operate as an NF set. For the sake of clarity, the method 600 will be described in relation to the system 500 shown in FIGS. 5A and 5B. In particular, the method 600 will be described in relation to the actions of the first source network element 510-1, the second source network element 510-2, the plurality of autonomous systems 514, the network element anycast set 502 (including the first network element instance 502-1 and the second network element instance 502-2), and the anycast set data store 508.

In accordance with the method 600, the first source network element 510-1 sends 601 a first message 518-1 that is addressed to the anycast IP address 504. The networking devices (e.g., routers) in the autonomous systems 514 route the first message 518-1 based on a pre-defined routing policy.

For purposes of the present example, it will be assumed that the first message 518-1 is routed based on a routing policy that selects the shortest path from the source to the destination. It will also be assumed that when the first source network element 510-1 sends the first message 518-1 to the anycast IP address 504, the first network element instance 502-1 is available. As noted above, when the first network element instance 502-1 is available, a routing policy that selects the shortest path from the source to the destination causes the first path 516-1 to be selected for messages that the first source network element 510-1 sends to the anycast IP address 504. Thus, in the depicted example, the first message 518-1 is routed from the first source network element 510-1 to the first network element instance 502-1 along the first path 516-1.

In response to receiving the first message 518-1, the first network element instance 502-1 can process 605 the first message 518-1. In connection with processing the first message 518-1, the first network element can access 607 information in the anycast set data store 508. FIG. 6A shows the first network element instance 502-1 retrieving state information 512 from the anycast set data store 508.

As part of processing the first message 518-1 and/or after the first message 518-1 has been processed, the first network element instance 502-1 can write information to the anycast set data store 508. FIG. 6A shows the first network element instance 502-1 writing 609 information (e.g., modified state information 512') to the anycast set data store 508.

Reference is now made to FIG. 6B. At a subsequent point in time, the second source network element 510-2 sends 611 a second message 518-2 that is addressed to the anycast IP address 504. The networking devices (e.g., routers) in the autonomous systems 514 route the second message 518-1 based on a pre-defined routing policy.

As before, it will be assumed that the second message 518-2 is routed based on a routing policy that selects the shortest path from the source to the destination. It will also be assumed that when the second source network element 510-2 sends the second message 518-2 to the anycast IP address 504, the second network element instance 502-2 is available. As noted above, when the second network element instance 502-2 is available, a routing policy that selects the shortest path from the source to the destination causes the fifth path 516-5 to be selected for messages that the second source network element 510-2 sends to the anycast IP address 504. Thus, in the depicted example, the second message 518-2 is routed from the second source network element 510-2 to the second network element instance 502-2 along the fifth path 516-5.

In response to receiving the second message 518-2, the second network element instance 502-2 can process 615 the second message 518-2. In connection with processing the second message 518-2, the second network element instance 502-2 can access 617 information in the anycast set data store 508. FIG. 6B shows the second network element instance 502-2 retrieving state information 512 from the anycast set data store 508.

As part of processing the second message 518-2 and/or after the second message 518-2 has been processed, the second network element instance 502-2 can write information to the anycast set data store 508. FIG. 6B shows the second network element instance 502-2 writing 619 information (e.g., modified state information 512') to the anycast set data store 508.

The method 600 shown in FIGS. 6A and 6B demonstrates how different network element instances within a network element anycast set 502 can receive and process messages that are sent by different source network elements. In particular, the first source network element 510-1 sends the first message 518-1 to the network element anycast set 502, and the second source network element 510-2 sends the second message 518-2 to the network element anycast set 502. The first message 518-1 is processed by the first network element instance 502-1, and the second message 518-2 is processed by the second network element instance 502-2.

Figure 7:
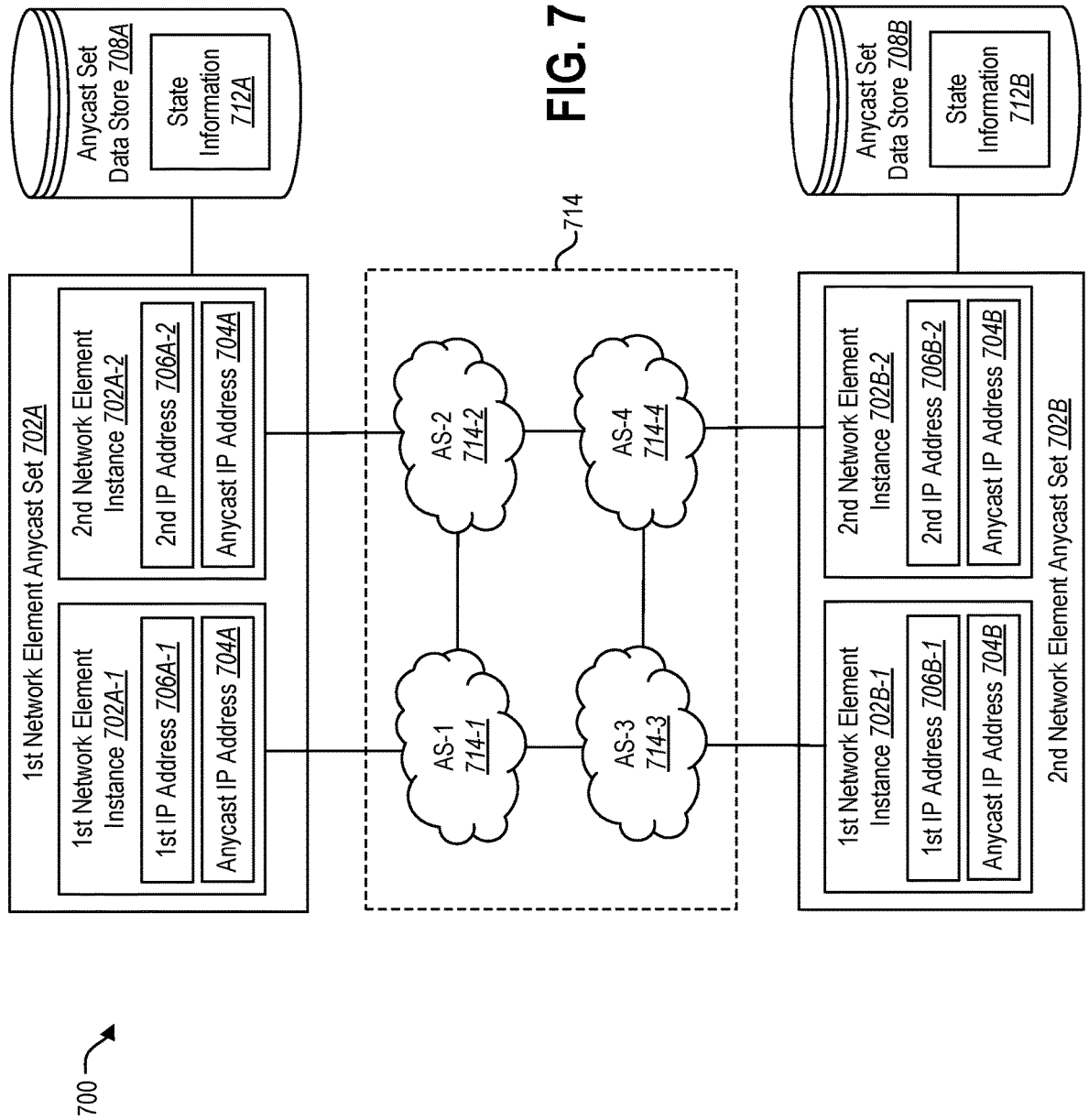
FIG. 7 illustrates another example of a system in which the techniques disclosed herein can be utilized.

FIG. 7 illustrates another example of a system 700 in which the techniques disclosed herein can be utilized. Whereas the examples described previously involve one or more source network elements communicating with a network element anycast set, the example depicted in FIG. 7 shows a plurality of different network element anycast sets. In particular, the system 700 shown in FIG. 7 includes a first network element anycast set 702A and a second network element anycast set 702B.

The first network element anycast set 702A includes a first network element instance 702A-1 and a second network element instance 702A-2. An anycast IP address 704A is assigned to the first network element anycast set 702A. The anycast IP address 704A is distinct from addresses of the individual network element instances that are part of the network element anycast set 702A. In particular, the anycast IP address 704A is distinct from a first IP address 706A-1 that is assigned to the first network element instance 702A-1 and a second IP address 706A-2 that is assigned to the second network element instance 702A-2. An anycast set data store 708A is provided to store information (e.g., state information 712A) that is accessible to all members of the first network element anycast set 702A.

The second network element anycast set 702B includes a first network element instance 702B-1 and a second network element instance 702B-2. An anycast IP address 704B is assigned to the second network element anycast set 702B. The anycast IP address 704B is distinct from addresses of the individual network element instances that are part of the network element anycast set 702B. In particular, the anycast IP address 704B is distinct from a first IP address 706B-1 that is assigned to the first network element instance 702B-1 and a second IP address 706B-2 that is assigned to the second network element instance 702B-2. An anycast set data store 708B is provided to store information (e.g., state information 712B) that is accessible to all members of the second network element anycast set 702B.

A plurality of autonomous systems 714 are shown between the first network element anycast set 702A and the second network element anycast set 702B. These autonomous systems 714 are depicted as AS-1 714-1, AS-2 714-2, AS-3 714-3, and AS-4 714-4.

Any member of the first network element anycast set 702A can send a message to the second network element anycast set 702B by addressing the message to the anycast IP address 704B that is associated with the second network element anycast set 702B. Networking devices (e.g., routers) among the autonomous systems 714 can route the message based on one or more pre-defined routing policies and deliver the message to one of the members of the second network element anycast set 702B for processing.

Similarly, any member of the second network element anycast set 702B can send a message to the first network element anycast set 702A by addressing the message to the anycast IP address 704A that is associated with the first network element anycast set 702A. Networking devices (e.g., routers) among the autonomous systems 714 can route the message based on one or more pre-defined routing policies and deliver the message to one of the members of the first network element anycast set 702A for processing.

In some embodiments, when a member of an anycast set sends a message to a member of another anycast set, the sender can use its own IP address as the source address. For example, suppose that the second network element instance 702B-2 in the second network element anycast set 702B sends a message to the first network element anycast set 702A. The source address of the data packet(s) that convey the message can be the second IP address 706B-2, while the destination address of the data packet(s) that convey the message can be the anycast IP address 704A assigned to the first network element anycast set 702A. One benefit of this approach is that any replies to the message can be sent directly to the sender (the second network element instance 702B-2 in this example).

Figure 8:
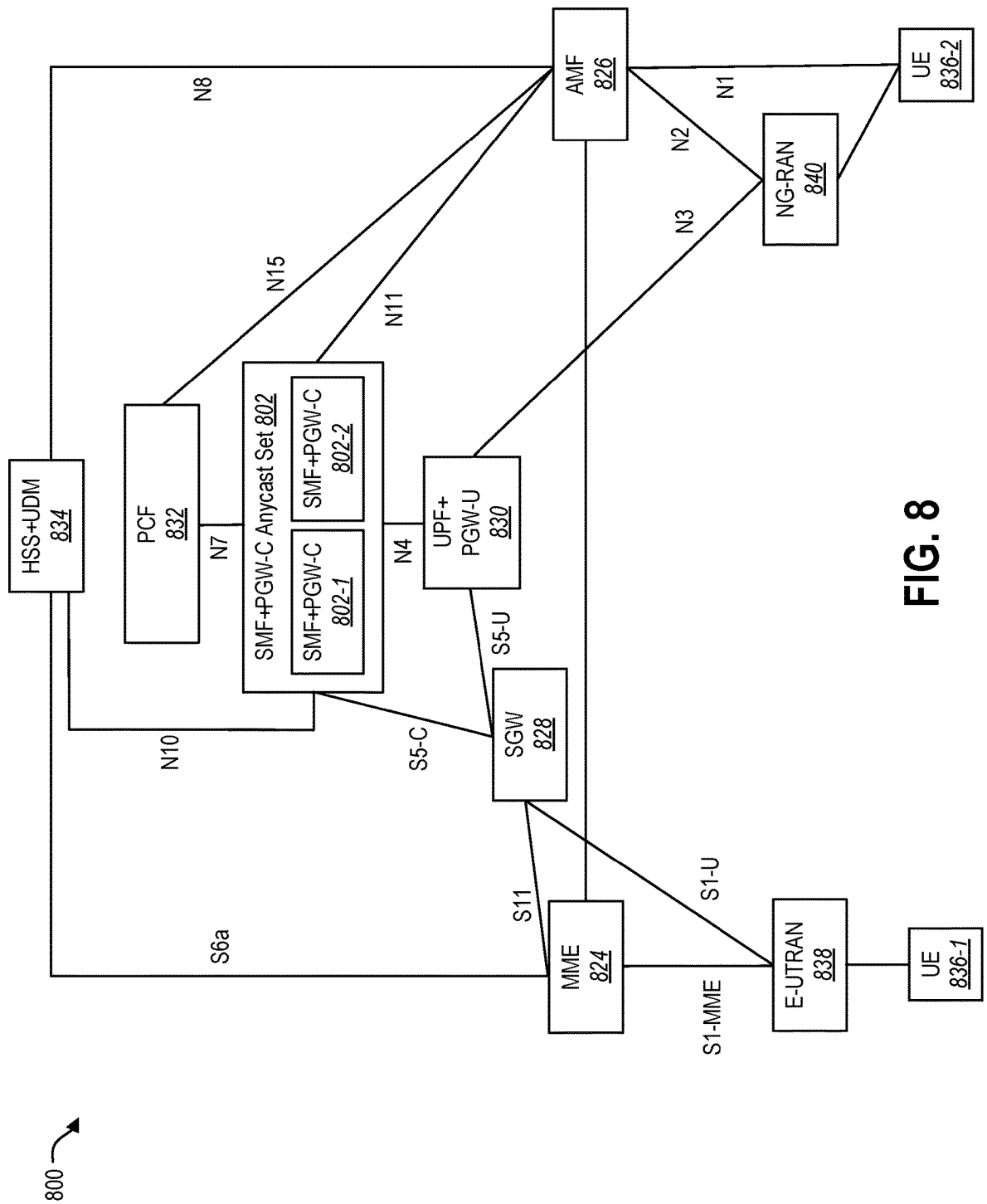
FIG. 8 illustrates another example of a system in which the techniques disclosed herein can be utilized, the system being related to a scenario that involves interworking between a 5G core system (5GS) and an Evolved Packet Core (EPC) and Evolved Universal Mobile Telecommunication System (UMTS) Terrestrial Radio Access Network (E-UTRAN).

FIG. 8 illustrates another example of a system 800 in which the techniques disclosed herein can be utilized. The system 800 shown in FIG. 8 depicts a scenario that involves interworking between a 5G core system (5GS) and an Evolved Packet Core (EPC) and Evolved Universal Mobile Telecommunication System (UMTS) Terrestrial Radio Access Network (E-UTRAN).

Presently, an SGW in the EPC can connect to an SMF+PGW–C. The techniques disclosed herein enable the SMF+PGW–C to be implemented as an SMF+PGW–C anycast set.

The core network 822 shown in FIG. 8 includes a mobility management entity (MME) 824, an access and mobility management function (AMF) 826, an SGW 828, a combined user plane function and user plane packet gateway (UPF+PGW–U) 830, a policy control function (PCF) 832, and a combined home subscriber service and unified data management network function (HSS+UDM) 834.

The core network 822 also includes an SMF+PGW–C anycast set 802. In the depicted example, the SMF+PGW–C anycast set 802 includes a first SMF+PGW–C instance 802-1 and a second SMF+PGW–C instance 802-2. Of course, in an alternative embodiment, an SMF+PGW–C anycast set can include more than two SMF+PGW–C instances.

A first UE 836-1 is shown connecting to the MME 824 via the E-UTRAN 838. A second UE 836-2 is shown connecting to the AMF 826 via the Next Generation Radio Access Network (NG-RAN) 840.

Interfaces between the various network elements are depicted in FIG. 8. These interfaces are defined in various 3GPP standards, including but not limited to TS 23.501.

Communication between the SGW 828 and the SMF+PGW–C anycast set 802 can occur in accordance with the techniques described herein. For example, when the SGW 828 has a message to send to an SMF+PGW–C instance, the SGW 828 can send the message to an anycast IP address that has been assigned to the SMF+PGW–C anycast set 802.

The functionality that has been described herein in connection with a network element anycast set (e.g., the network element anycast set 102 in FIG. 1, the network element anycast set 502 in FIGS. 5A and 5B, the first network element anycast set 702A and the second network element anycast set 702B in FIG. 7, and the SMF+PGW−C anycast set 802 in FIG. 8) can be implemented using one or more computing systems. For example, an instance of network element that is included in anycast set can be implemented using one or more computing systems.

Figure 9:
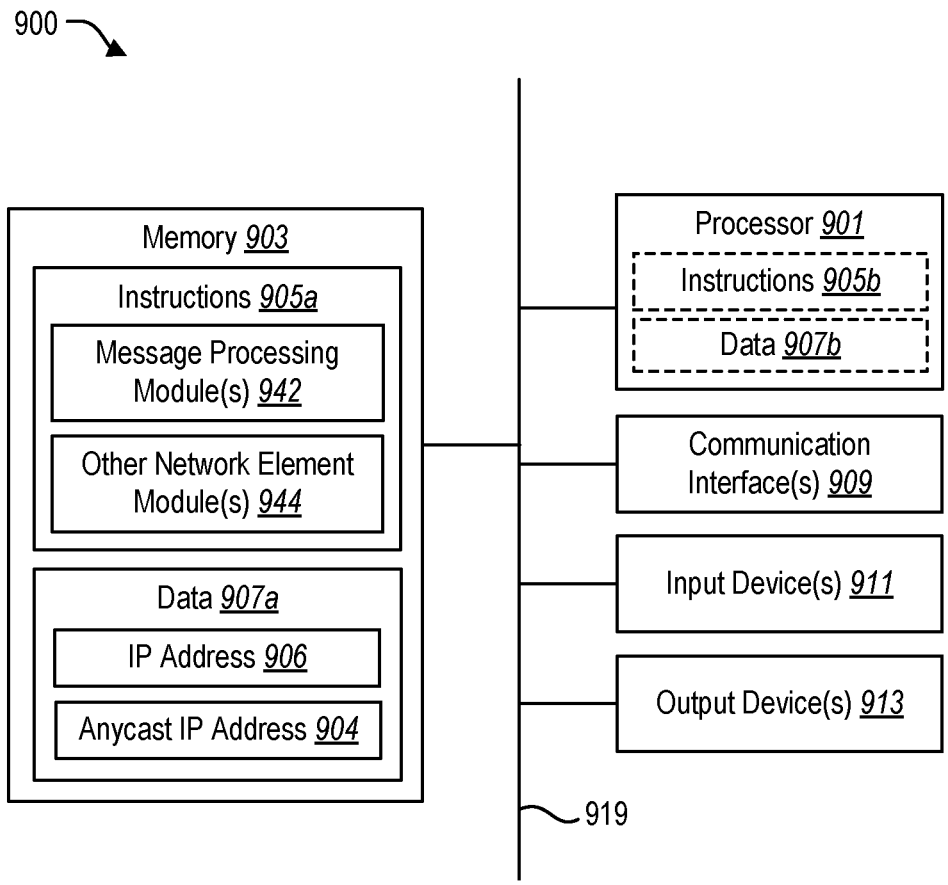
FIG. 9 illustrates certain components that can be included within a computing system that can be used to implement the actions and operations that are described herein in connection with one or more network elements that are included in a network element anycast set.

FIG. 9 illustrates certain components that can be included within a computing system 900. The computing system 900 can be used to implement the actions and operations that have been described herein in connection with one or more network elements that are included in a network element anycast set. In some embodiments, a plurality of computing systems 900 can collectively implement the actions and operations that have been described herein in connection with a network element anycast set.

The computing system 900 includes a processor 901 and memory 903 in electronic communication with the processor 901. Instructions 905a and data 907a can be stored in the memory 903. The instructions 905a can be executable by the processor 901 to implement some or all of the methods, steps, operations, actions, or other functionality related to a network element anycast set that is disclosed herein. Executing the instructions 905a can involve the use of the data 907a that is stored in the memory 903. When the processor 901 executes the instructions 905a, various instructions 905b can be loaded onto the processor 901, and various pieces of data 907b can be loaded onto the processor 901.

Unless otherwise specified, any of the various examples of modules and components described herein in connection with a network element anycast set can be implemented, partially or wholly, as instructions 905a stored in memory 903 and executed by the processor 901. Any of the various examples of data described herein in connection with a network element anycast set can be among the data 907a that is stored in memory 903 and used during execution of the instructions 905a by the processor 901.

Although just a single processor 901 and a single memory 903 are shown in the computing system 900 of FIG. 9, in an alternative configuration, a combination of processors and/or a combination of memory devices could be used.

The instructions 905a in the memory 903 can include one or more modules that can be executable by the processor 901 to perform some or all aspects of the methods that have been described herein in connection with a network element in a network element anycast set (e.g., the method 200 shown in FIGS. 2A and 2B, the method 300 shown in FIG. 3, the method 600 shown in FIGS. 6A and 6B). Such modules can include one or more message processing module(s) 942 and one or more other network element module(s) 944.

The data 907a stored in the memory 903 can include any of the various examples of data described herein in connection with a network element in a network element anycast set. For example, the data 907a stored in the memory 903 can represent data that is stored, accessed, or otherwise used in connection with the methods that have been described herein in connection with a network element in a network element anycast set (e.g., the method 200 shown in FIGS. 2A and 2B, the method 300 shown in FIG. 3, the method 600 shown in FIGS. 6A and 6B).

For example, the data 907a stored in the memory 903 can include an IP address 906 associated with a particular network element instance. The IP address 906 shown in FIG. 9 can represent any of the IP addresses described herein in connection with individual network elements (e.g., the first IP address 106-1 associated with the first network element instance 102-1 in FIG. 1).

The data 907a stored in the memory 903 can also include an anycast IP address 904 associated with a network element anycast set to which the network element instance belongs. The anycast IP address 904 shown in FIG. 9 can represent any of the anycast IP addresses described herein in connection with a network element anycast set (e.g., the anycast IP address 104 associated with the network element anycast set 102 in FIG. 1).

The computing system 900 can also include various other components, including one or more communication interfaces 909, one or more input devices 911, and one or more output devices 913.

The communication interface(s) 909 can be configured to communicate with other computing systems and networking devices. This includes receiving data transmissions from other computing systems and networking devices, and also sending data transmissions to other computing systems and networking devices. For example, if the computing system 900 is being used to implement one or more network elements, the communication interface(s) 909 can be used to receive incoming messages from one or more other network elements.

The various components of the computing system 900 can be coupled together by one or more buses, which can include a power bus, a control signal bus, a status signal bus, a data bus, etc. For simplicity, the various buses are illustrated in FIG. 9 as a bus system 919.

Figure 10:
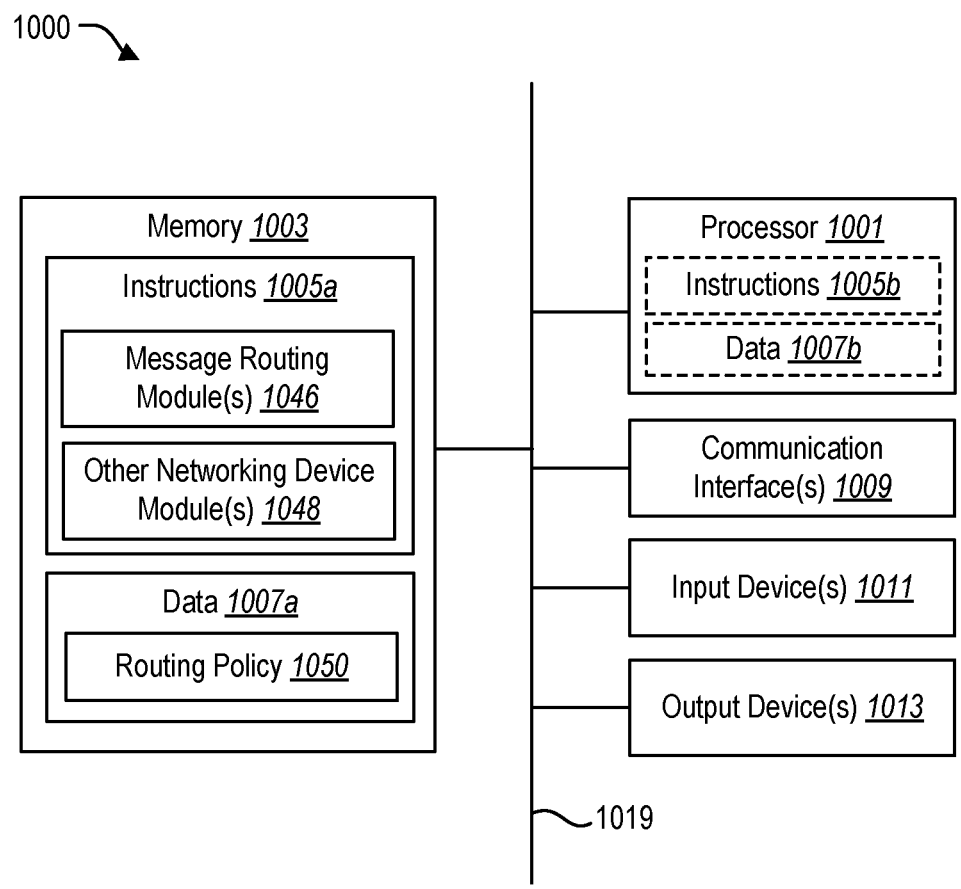
FIG. 10 illustrates certain components that can be included within a networking device that can be used to implement the actions and operations that are described herein in connection with autonomous systems.

FIG. 10 illustrates certain components that can be included within a networking device 1000. The networking device 1000 can be used to implement the actions and operations that have been described herein in connection with autonomous systems (e.g., the autonomous systems 114 shown in FIG. 1). In some embodiments, a plurality of networking devices 1000 can collectively implement the actions and operations that have been described herein in connection with an autonomous system.

The networking device 1000 includes a processor 1001 and memory 1003 in electronic communication with the processor 1001. Instructions 1005a and data 1007a can be stored in the memory 1003. The instructions 1005a can be executable by the processor 1001 to implement some or all of the methods, steps, operations, actions, or other functionality related to a networking device that is disclosed herein. Executing the instructions 1005a can involve the use of the data 1007a that is stored in the memory 1003. When the processor 1001 executes the instructions 1005a, various instructions 1005b can be loaded onto the processor 1001, and various pieces of data 1007b can be loaded onto the processor 1001.

Unless otherwise specified, any of the various examples of modules and components described herein in connection with a networking device can be implemented, partially or wholly, as instructions 1005a stored in memory 1003 and executed by the processor 1001. Any of the various examples of data described herein in connection with a networking device can be among the data 1007a that is stored in memory 1003 and used during execution of the instructions 1005a by the processor 1001.

Although just a single processor 1001 and a single memory 1003 are shown in the networking device 1000 of FIG. 10, in an alternative configuration, a combination of processors and/or a combination of memory devices could be used.

The instructions 1005a in the memory 1003 can include one or more modules that can be executable by the processor 1001 to perform some or all aspects of the methods that have been described herein in connection with one or more networking devices (e.g., the method 400 shown in FIG. 4). Such modules can include one or more message routing module(s) 1046 and one or more other networking device module(s) 1048.

The data 1007a stored in the memory 1003 can include any of the various examples of data described herein in connection with a networking device. For example, the data 1007a stored in the memory 1003 can represent data that is stored, accessed, or otherwise used in connection with the methods, actions, or operations that have been described herein in connection with a networking device (e.g., the method 400 shown in FIG. 4).

For example, the data 1007a stored in the memory 1003 can include a routing policy 1050. The networking device 1000 can be configured to route incoming messages (e.g., messages sent by a network element such as the source network element 110 shown in FIG. 1) based at least in part on the routing policy 1050. When an incoming message is addressed to an anycast IP address, routing the message based on the routing policy 1050 can have the effect of selecting a member of the corresponding anycast set to receive and process the message, as described above.

The networking device 1000 can also include various other components, including one or more communication interfaces 1009, one or more input devices 1011, and one or more output devices 1013.

The communication interface(s) 1009 can be configured to communicate with other networking devices and other computing systems. This includes receiving data transmissions from other networking devices and other computing systems, and also sending data transmissions to other networking devices and other computing systems. The communication interface(s) 1009 can be used in connection with routing incoming messages. For example, the communication interface(s) 1009 can be used to receive incoming messages from other networking devices and/or other computing systems. The communication interface(s) 1009 can also be used to forward the messages to other networking devices and/or other computing systems.

The various components of the networking device 1000 can be coupled together by one or more buses, which can include a power bus, a control signal bus, a status signal bus, a data bus, etc. For simplicity, the various buses are illustrated in FIG. 10 as a bus system 1019.

The term "network element" can refer generally to any component of a mobile network. In some embodiments, the term "network element" can refer generally to any component of a core network within a mobile network. Under some circumstances, a network element can be a network function. Alternatively, a network element can be another type of network element besides a network function.

The term "message" can refer generally to a communication from one computing or electronic device to another computing or electronic device. A message can be conveyed using just one data packet or using a plurality of data packets.

The term "routing policy" can refer to a set of one or more rules, algorithms, procedures, protocols, or the like that control or affect routing of data packets in a computer network.

The term "pre-5G" can refer to mobile network technology that operates in accordance with 4G or earlier technology.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for improving availability of a type of network element in a mobile network, the method being implemented by a network element anycast set in a core network of the mobile network, the network element anycast set comprising a first network element instance and a second network element instance, the method comprising:
   receiving a first message from a first source network element at the first network element instance, wherein the first message is addressed to an anycast address that is assigned to the network element anycast set;
   processing the first message by the first network element instance;
   accessing, by the first network element instance, state information corresponding to a user equipment from an anycast set data store in relation to processing the first message;
   receiving a second message from the first source network element at the second network element instance when the first network element instance is unavailable, wherein the second message is also addressed to the anycast address;
   processing the second message by the second network element instance; and
   accessing, by the second network element instance, the state information corresponding to the user equipment from the anycast set data store in relation to processing the second message.

2. The method of claim 1, wherein:
   the first network element instance and the second network element instance utilize the anycast address when a pre-5G service is being provided to the user equipment; and
   the first network element instance and the second network element instance utilize individual internet protocol addresses when a 5G service is being provided to the user equipment.

3. The method of claim 1, wherein accessing the anycast set data store in relation to processing the first message includes:
   reading the state information corresponding to the user equipment from the anycast set data store in relation to processing the first message; and
   writing modified state information to the anycast set data store in relation to processing the first message.

4. The method of claim 1, further comprising generating the anycast set data store within the core network of the mobile network in connection with generating the network element anycast set, wherein the anycast set data store is accessible to all members of the network element anycast set.

5. The method of claim 1, wherein:
   the first network element instance comprises a first instance of a combined session management function and control plane packet gateway (SMF+PGW–C); and
   the second network element instance comprises a second instance of the SMF+PGW–C.

6. The method of claim 1, wherein:
   the first network element instance comprises a first instance of a combined session management function, control plane packet gateway, and gateway GPRS support node (SMF+PGW–C+GGSN); and
   the second network element instance comprises a second instance of the SMF+PGW–C+GGSN.

7. The method of claim 1, wherein:
   the first network element instance comprises a first instance of a packet gateway (PGW); and
   the second network element instance comprises a second instance of the PGW.

8. The method of claim 1, wherein:
   the first network element instance comprises a first instance of a serving gateway (SGW); and
   the second network element instance comprises a second instance of the SGW.

9. A method for improving availability of a type of network element in a mobile network, the method being implemented by at least one networking device that interconnects a first source network element and a network element anycast set, the network element anycast set comprising a first network element instance and a second network element instance, the method comprising:
   receiving a first message from the first source network element, the first message being addressed to an anycast set address that is associated with the network element anycast set;
   routing the first message along a first path that leads to the first network element instance, the routing being based at least in part on a routing policy;
   accessing, by the first network element instance, state information corresponding to a user equipment from an anycast set data store in relation to processing the first message;
   determining that the first network element instance is unavailable;
   receiving a second message from the first source network element when the first network element instance is unavailable, the second message being addressed to the anycast set address;
   routing the second message along a second path that leads to the second network element instance based at least in part on the routing policy; and accessing, by the second network element instance, the state information corresponding to the user equipment from the anycast set data store in relation to processing the second message.

10. The method of claim 9, further comprising:
receiving an additional message from a second source network element when the first network element instance is available, wherein the additional message is also addressed to the anycast set address; and
routing the second message along an additional path that leads to the second network element instance based at least in part on the routing policy.

11. The method of claim 9, wherein the anycast set address is distinct from a first IP address associated with the first network element instance and a second IP address associated with the second network element instance.

12. The method of claim 9, wherein the type of network element cannot operate as a network function set.

13. The method of claim 9, wherein:
the first network element instance comprises a first instance of a combined session management function and control plane packet gateway (SMF+PGW–C); and
the second network element instance comprises a second instance of the SMF+PGW–C.

14. The method of claim 9, wherein:
the first network element instance comprises a first instance of a combined session management function, control plane packet gateway, and gateway GPRS support node (SMF+PGW–C+GGSN); and
the second network element instance comprises a second instance of the SMF+PGW–C+GGSN.

15. The method of claim 9, wherein:
the first network element instance comprises a first instance of a packet gateway (PGW); and
the second network element instance comprises a second instance of the PGW.

16. The method of claim 9, wherein:
the first network element instance comprises a first instance of a serving gateway (SGW); and
the second network element instance comprises a second instance of the SGW.

17. A system for improving availability of a type of network element in a mobile network, the system comprising:
one or more processors;
memory in electronic communication with the one or more processors;
an anycast address stored in the memory, the anycast address being assigned to a network element anycast set comprising a first network element instance and a second network element instance;
an anycast set data store within a core network of the mobile network, the anycast set data store being associated with the network element anycast set and accessible to the first network element instance and the second network element instance; and
instructions stored in the memory, the instructions being executable by the one or more processors to:
receive a first message from a first source network element at the first network element instance, wherein the first message is addressed to the anycast address;
process the first message by the first network element instance;
access, by the first network element instance, state information corresponding to a user equipment from the anycast set data store in relation to processing the first message;
receive a second message from the first source network element at the second network element instance when the first network element instance is unavailable, wherein the second message is also addressed to the anycast address;
process the second message by the second network element instance; and
access, by the second network element instance, the state information corresponding to the user equipment from the anycast set data store in relation to processing the second message.

18. The system of claim 17, further comprising additional instructions that are executable by the one or more processors to:
receive an additional message from a second source network element at the second network element instance when the first network element instance is available, wherein the additional message is also addressed to the anycast address;
process the additional message by the second network element instance; and
access, by the second network element instance, the state information corresponding to the user equipment from the anycast set data store in relation to processing the additional message.

19. The system of claim 17, wherein the anycast address is distinct from a first IP address associated with the first network element instance and a second IP address associated with the second network element instance.

20. The system of claim 17, wherein the type of network element cannot operate as a 5G network function set.

* * * * *